US012686566B2

(12) United States Patent
Zhu et al.

(10) Patent No.: US 12,686,566 B2
(45) Date of Patent: Jul. 21, 2026

(54) TRAY SEPARATING APPARATUS, SECURITY CHECK SYSTEM, TRAY SEPARATING METHOD, AND COMPUTER READABLE STORAGE MEDIUM

(71) Applicant: VANDERLANDE INDUSTRIES LOGISTICS AUTOMATED SYSTEMS (SHANGHAI) CO., LTD, Shanghai (CN)

(72) Inventors: Chi Zhu, Shanghai (CN); Jinke Fu, Shanghai (CN); Zemin Yang, Shanghai (CN)

(73) Assignee: VANDERLANDE INDUSTRIES LOGISTICS AUTOMATED SYSTEMS (SHANGHAI) CO., LTD, Shanghai (CN)

( * ) Notice: Subject to any disclaimer, the term of this patent is extended or adjusted under 35 U.S.C. 154(b) by 440 days.

(21) Appl. No.: 18/279,775

(22) PCT Filed: Sep. 10, 2021

(86) PCT No.: PCT/CN2021/117618
§ 371 (c)(1),
(2) Date: Aug. 31, 2023

(87) PCT Pub. No.: WO2022/183705
PCT Pub. Date: Sep. 9, 2022

(65) Prior Publication Data
US 2024/0140723 A1 May 2, 2024

(30) Foreign Application Priority Data
Mar. 1, 2021 (CN) .......................... 202110224705.1

(51) Int. Cl.
*B65G 43/00* (2006.01)
*B65G 13/06* (2006.01)

(52) U.S. Cl.
CPC ............. *B65G 43/00* (2013.01); *B65G 13/06* (2013.01); *B65G 2201/0258* (2013.01)

(58) Field of Classification Search
CPC ...... B65G 13/06; B65G 43/00; B65G 59/105; B65G 59/107; B65G 60/00; B65G 2201/0258
See application file for complete search history.

(56) References Cited

U.S. PATENT DOCUMENTS 3,419,186 A * 12/1968 Cease .................. B65G 59/103
221/221
3,601,282 A * 8/1971 Vogel ................... B65G 59/105
222/298
(Continued)

FOREIGN PATENT DOCUMENTS

CN 110155731 A 8/2019
CN 111257963 A 6/2020
(Continued)

*Primary Examiner* — Gene O Crawford
*Assistant Examiner* — Kelvin L Randall, Jr.
(74) *Attorney, Agent, or Firm* — Maschoff Brennan

(57) ABSTRACT

Embodiments of the present disclosure may include a tray separating apparatus that may include a main body having an accommodating part extending in a first direction. Additionally, the present disclosure may include a tray inlet located at a top of the main body. Additionally, embodiments may include a tray outlet that may be located at a side of the main body and a first transmission part that may be located at the bottom of the accommodating part. Embodiments may additionally include a first limiting part, mounted on the main body, where the first limiting part may be configured to switch between a first position and a second position; and a second limiting part may be located below the first limiting part in the first direction and where the second limiting part may be configured to switch between a third position and a fourth position.

22 Claims, 10 Drawing Sheets

(56)    References Cited

U.S. PATENT DOCUMENTS

| | | | | |
|---|---|---|---|---|
| 4,323,168 | A * | 4/1982 | Callahan | B65G 59/107 |
| | | | | 221/277 |
| 4,439,101 | A * | 3/1984 | Orlowski | B65G 59/101 |
| | | | | 414/795.8 |
| 4,909,412 | A * | 3/1990 | Cerf | B65G 59/105 |
| | | | | 221/221 |
| 4,943,207 | A * | 7/1990 | Provan | B65G 59/108 |
| | | | | 221/222 |
| 4,993,587 | A * | 2/1991 | Abe | B65H 3/063 |
| | | | | 221/21 |
| 7,153,089 | B2 * | 12/2006 | Wisniewski | B65G 57/302 |
| | | | | 414/788.2 |
| 8,474,595 | B2 | 7/2013 | Crass et al. | |
| 2020/0247637 | A1 * | 8/2020 | Hoffman | B65H 5/06 |

FOREIGN PATENT DOCUMENTS

| | | | | |
|---|---|---|---|---|
| CN | 112849911 A | 5/2021 | | |
| DE | 10 2010 026 940 A1 | 1/2012 | | |
| WO | WO-2020245089 A1 * | 12/2020 | | B64F 1/368 |

* cited by examiner

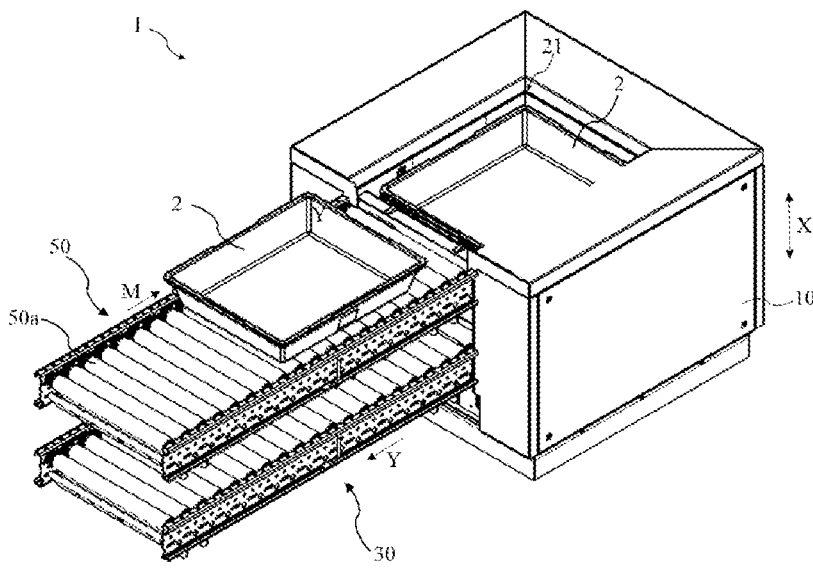

Fig. 14

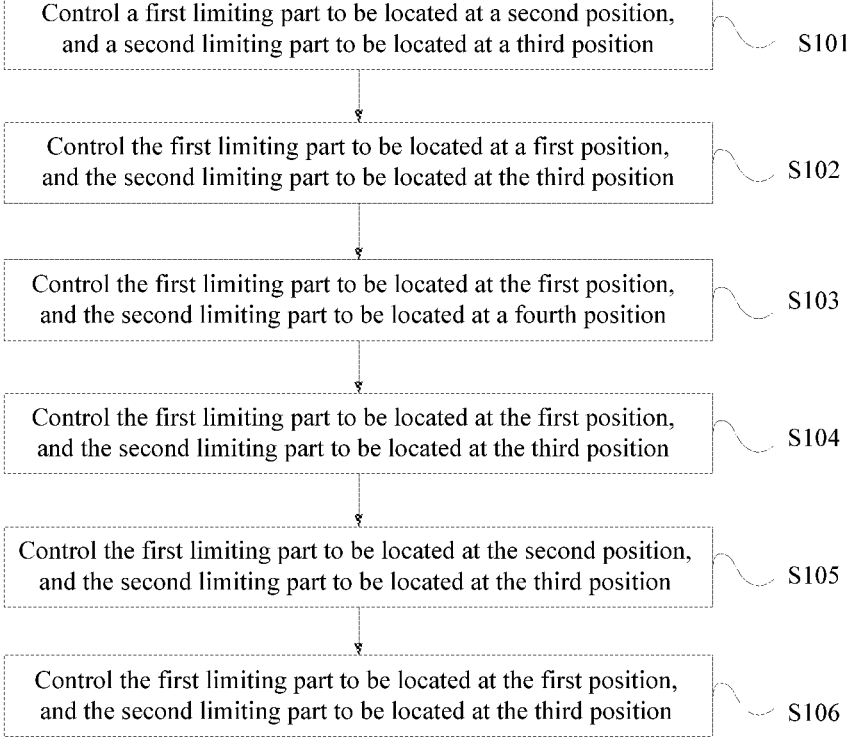

| Control a first limiting part to be located at a second position, and a second limiting part to be located at a third position | S101 |

| Control the first limiting part to be located at a first position, and the second limiting part to be located at the third position | S102 |

| Control the first limiting part to be located at the first position, and the second limiting part to be located at a fourth position | S103 |

| Control the first limiting part to be located at the first position, and the second limiting part to be located at the third position | S104 |

| Control the first limiting part to be located at the second position, and the second limiting part to be located at the third position | S105 |

| Control the first limiting part to be located at the first position, and the second limiting part to be located at the third position | S106 |

Fig. 15

TRAY SEPARATING APPARATUS, SECURITY CHECK SYSTEM, TRAY SEPARATING METHOD, AND COMPUTER READABLE STORAGE MEDIUM

TECHNICAL FIELD

The present invention relates to the technical field of travel inspection, in particular to a tray separating apparatus, a security check system, a tray separating method, and a computer readable storage medium.

BACKGROUND

In the prior art, during security checks at airports, train stations and other places, passengers will take empty luggage trays next to a security check machine and place their carry-on luggage in the luggage trays, and the luggage trays containing the luggage will enter the security check machine for security checks. After the luggage trays pass through the security check machine, the passengers take their luggage from the luggage trays and leave the empty luggage trays (hereinafter referred to as empty trays). Security staff will collect the empty trays and stack them together, and then transport the stacked empty trays to a front end of the security check machine. The passengers will take out the stacked empty trays one by one to place the luggage for security checks, which affects security check efficiency of the passengers.

SUMMARY

An objective of the present invention is to solve the technical problem of low security check efficiency. The present invention provides a tray separating apparatus, a tray separating method, and a computer readable storage medium. The tray separating apparatus may be used for separating stacked empty trays, and then transmitting the empty trays to passengers one by one for luggage placement of the passengers, so as to perform security checks.

In order to solve the above technical problem, an implementation of the present invention discloses a tray separating apparatus, including: a main body, having an accommodating part, the accommodating part extending in a first direction; a tray inlet, located at a top of the main body, the tray inlet communicating with the accommodating part, and the accommodating part being configured to receive an empty tray placed from the tray inlet; a tray outlet, located at a side of the main body, the tray outlet communicating with the accommodating part; a first transmission part, located at a bottom of the accommodating part, the first transmission part being configured to carry the empty tray, and output the empty tray from the tray outlet in a second direction, and the second direction being perpendicular to the first direction; a first limiting part, mounted on the main body, where the first limiting part is able to be switched between a first position and a second position; and a second limiting part, mounted on the main body, and in the first direction, the second limiting part being located below the first limiting part, where the second limiting part is able to be switched between a third position and a fourth position. At the first position, the first limiting part is able to abut against the empty tray placed from the tray inlet, so as to limit downward movement of the empty tray in the first direction, and the empty tray that abuts against the first limiting part is able to be stacked with more than one empty tray placed from the tray inlet; at the second position, the first limiting part is able to be separated from the empty tray placed from the tray inlet, so as to enable the empty tray to move downwards in the first direction; at the third position, the second limiting part is able to abut against the empty tray placed from the tray inlet, so as to limit downward movement of the empty tray in the first direction; and at the fourth position, the second limiting part is able to be separated from the empty tray placed from the tray inlet, so as to enable one empty tray to move downwards in the first direction to be borne by the first transmission part.

By adopting the above technical solution, separated empty trays, instead of stacked empty trays, may be transmitted to passengers one by one, it is convenient for the passengers to take the empty trays to place their luggage for security checks, and therefore security check efficiency is improved.

According to another specific implementation of the present invention, at the third position, the second limiting part is able to abut against the empty tray that is separated from the first limiting part; and at the fourth position, the second limiting part is able to be separated from one empty tray that is separated from the first limiting part.

According to another specific implementation of the present invention, at the third position, the second limiting part is able to abut against one empty tray, and the empty tray is able to be stacked with the other empty tray; at the fourth position, the second limiting part is able to be separated from the one empty tray; at the first position, the first limiting part is able to abut against the other empty tray, and the other empty tray is able to be stacked with more than one empty tray placed from the tray inlet; and at the second position, the first limiting part is able to be separated from the other empty tray, so as to enable the other empty tray and the empty trays stacked in the another empty tray to move downwards in the first direction, and the other empty tray is able to abut against the second limiting part.

According to another specific implementation of the present invention, at the first position, the first limiting part is able to abut against a lowest empty tray among the multiple stacked empty trays placed from the tray inlet; and at the second position, the first limiting part is able to be separated from the lowest empty tray.

According to another specific implementation of the present invention, at the first position, the first limiting part is able to abut against one empty tray; at the third position, the second limiting part is able to abut against one empty tray; and the empty tray that abuts against the first limiting part is located in the empty tray that abuts against the second limiting part.

According to another specific implementation of the present invention, in a third direction, the accommodating part includes a first part and a second part which are oppositely arranged, the first part and the second part extend in the first direction respectively, the first part is provided with a first through hole, the second part is provided with a second through hole, and the first direction, the second direction and the third direction are perpendicular to one another;

the first limiting part includes:

a first electric cylinder, mounted on one side of the main body opposite to the first part, where the first electric cylinder has a first telescopic piece, the first telescopic piece is provided with a first clamping piece, and the first clamping piece is located at the first through hole; and a second electric cylinder, mounted on one side of the main body opposite to the second part, and spaced apart from the first electric cylinder in the third direction, where the second electric cylinder has a second telescopic piece, the second telescopic piece is provided with a second clamping piece, and the second clamping piece is located at the second through hole;

the second limiting part includes:

a third electric cylinder, mounted on the side of the main body opposite to the first part, where the third electric cylinder has a third telescopic piece, the third telescopic piece is provided with a third clamping piece, and the third clamping piece is located at the first through hole; and a fourth electric cylinder, mounted on the side of the main body opposite to the second part, and spaced apart from the third electric cylinder in the third direction, where the fourth electric cylinder has a fourth telescopic piece, the fourth telescopic piece is provided with a fourth clamping piece, and the fourth clamping piece is located at the second through hole.

At the first position, the first telescopic piece and the second telescopic piece are able to move in a direction towards the accommodating part, so that the first clamping piece extends into the accommodating part through the first through hole to abut against one side of one empty tray, and the second clamping piece extends into the accommodating part through the second through hole to abut against the other side of the empty tray, so as to limit downward movement of the empty tray in the first direction;

at the second position, the first telescopic piece and the second telescopic piece are able to move in a direction away from the accommodating part, so that the first clamping piece retracts through the first through hole to be separated from one side of one empty tray, and the second clamping piece retracts through the second through hole to be separated from the other side of the empty tray, so as to enable the empty tray to move downwards in the first direction;

at the third position, the third telescopic piece and the fourth telescopic piece are able to move in the direction towards the accommodating part, so that the third clamping piece extends into the accommodating part through the first through hole to abut against one side of one empty tray, and the fourth clamping piece extends into the accommodating part through the second through hole to abut against the other side of the empty tray, so as to limit downward movement of the empty tray in the first direction; and at the fourth position, the third telescopic piece and the fourth telescopic piece are able to move in the direction away from the accommodating part, so that the third clamping piece retracts through the first through hole to be separated from one side of one empty tray, and the fourth clamping piece retracts through the second through hole to be separated from the other side of the empty tray, so as to enable the empty tray to move downwards in the first direction to be borne by the first transmission part.

According to another specific implementation of the present invention, the first clamping piece is arranged parallel to the third clamping piece, and the second clamping piece is arranged parallel to the fourth clamping piece.

According to another specific implementation of the present invention, the first clamping piece and the third clamping piece extend towards a top of the accommodating part in a fourth direction, the second clamping piece and the fourth clamping piece extend towards the top of the accommodating part in a fifth direction, an included angle between the fourth direction and the first direction is a first acute angle, an included angle between the fifth direction and the first direction is a second acute angle, and the first acute angle is equal to the second acute angle.

According to another specific implementation of the present invention, the first clamping piece, the second clamping piece, the third clamping piece and the fourth clamping piece are in a sheet shape respectively; at the first position, the first clamping piece and the second clamping piece are able to abut against an outer edge of one empty tray; and at the third position, the third clamping piece and the fourth clamping piece are able to abut against the outer edge of one empty tray.

According to another specific implementation of the present invention, in the first direction, a distance between the first clamping piece and the third clamping piece, and a distance between the second clamping piece and the fourth clamping piece meet following requirement: an outer edge of a lower empty tray in any two adjacent stacked empty trays is able to abut against the third clamping piece and the fourth clamping piece, and an outer edge of an upper empty tray in the any two adjacent stacked empty trays is able to abut against the first clamping piece and the second clamping piece.

According to another specific implementation of the present invention, the tray separating apparatus further includes:

a first detection hole, communicating with the accommodating part, where the first detection hole is provided with a first sensor, the first sensor is configured to detect whether an empty tray exists at a first height, and in the first direction, the first height is higher than a height of a position where the first limiting part is located;

a second detection hole, communicating with the accommodating part, where the second detection hole is provided with a second sensor, the second sensor is configured to detect whether an empty tray exists at a second height, the second height is smaller than the first height, and the second height is higher than the height of the position where the first limiting part is located;

a third detection hole, communicating with the accommodating part, where the third detection hole is provided with a third sensor, and the third sensor is configured to detect whether an empty tray that abuts against the first limiting part exists;

a fourth detection hole, communicating with the accommodating part, where the fourth detection hole is provided with a fourth sensor, and the fourth sensor is configured to detect whether an empty tray that abuts against the second limiting part exists; and a fifth detection hole, communicating with the accommodating part, where the fifth detection hole is provided with a fifth sensor, and the fifth sensor is configured to detect whether an area of corresponding to the first transmission part corresponding to the accommodating part carries an empty tray.

According to another specific implementation of the present invention, each sensor is able to emit laser rays to the outer edges of the empty trays for corresponding detection.

According to another specific implementation of the present invention, the quantity of the fifth detection hole is two, each fifth detection hole is provided with one fifth sensor, and the two fifth sensors are arranged in the second direction at an interval, and correspond to the area of the first transmission part corresponding to the accommodating part; and in the second direction, a detection distance between the two fifth sensors is a first numerical value, a width of the area of the first transmission part corresponding to the accommodating part is a second numerical value, and a difference value between the first numerical value and the second numerical value is within a set range.

According to another specific implementation of the present invention, the first numerical value is equal to the second numerical value.

According to another specific implementation of the present invention, the first transmission part includes: multiple electric rollers distributed in the second direction.

According to another specific implementation of the present invention, the tray separating apparatus further includes: a second transmission part, spaced apart from and parallel to the first transmission part in the first direction, where the second transmission part is configured to transmit empty trays to the tray inlet.

According to another specific implementation of the present invention, the second transmission part includes: multiple electric rollers distributed in the second direction.

The present application further provides a security check system, including the tray separating apparatus described in any above embodiment.

The present application further provides a tray separating method, adopting the tray separating apparatus described in any above embodiment, and including:

S101: controlling a first limiting part to stay at a second position, and a second limiting part to stay at a third position;

S102: controlling the first limiting part to stay at a first position, and the second limiting part to stay at the third position;

S103: controlling the first limiting part to stay at the first position, and the second limiting part to stay at a fourth position;

S104: controlling the first limiting part to stay at the first position, and the second limiting part to stay at the third position;

S105: controlling the first limiting part to stay at the second position, and the second limiting part to stay at the third position; and S106: controlling the first limiting part to stay at the first position, and the second limiting part to stay at the third position.

According to another specific implementation of the present invention, above S103 to S106 are repeated.

According to another specific implementation of the present invention,

S101: controlling the first limiting part to stay at the second position, and the second limiting part to stay at the third position, and transmitting empty trays to a tray inlet of an accommodating part, where the second limiting part abuts against one empty tray placed from the tray inlet, and the empty tray that abuts against the second limiting part is stacked with at least one empty tray;

S102: controlling the first limiting part to stay at the first position, and the second limiting part to stay at the third position, where the first limiting part abuts against the empty trays stacked in the empty tray that abuts against the second limiting part, and the empty trays that abut against the first limiting part are able to be stacked with more than one empty tray placed from the tray inlet;

S103: controlling the first limiting part to stay at the first position, and the second limiting part to stay at the fourth position, where one empty tray that abuts against the second limiting part is separated from the second limiting part, and moves downwards in a first direction to be borne by a first transmission part, and the first transmission part outputs the empty tray through a tray outlet in a second direction;

S105: controlling the first limiting part to stay at the second position, and the second limiting part to stay at the third position, where all empty trays that abut against the first limiting part are separated from the first limiting part, and move downwards in the first direction to abut against the second limiting part; and S106: controlling the first limiting part to stay at the first position, and the second limiting part to stay at the third position, where the first limiting part abuts against the empty trays stacked in the empty tray that abuts against the second limiting part.

According to another specific implementation of the present invention, in a case of adopting the tray separating apparatus described in any above embodiment, when a first sensor detects that an empty tray exists at a first height, manual transmission of the empty trays to the tray inlet of the accommodating part is stopped;

when a second sensor detects that an empty tray exists at a second height, automatic transmission of the empty trays to the tray inlet of the accommodating part is stopped;

when a third sensor detects that an empty tray that abuts against the first limiting part exists, a fourth sensor detects that no empty tray that abuts against the second limiting part exists, and the second limiting part stays at the third position, the first limiting part is controlled to stay at the second position;

when the fourth sensor detects that an empty tray that abuts against the second limiting part exists, the first limiting part is controlled to stay at the first position;

when the fourth sensor detects that the empty tray that abuts against the second limiting part exists, and a fifth sensor detects that an area of the first transmission part corresponding to the accommodating does not carry an empty tray, the second limiting part is controlled to stay at the fourth position, and the first limiting part is controlled to stay at the first position;

when the fourth sensor detects that the empty tray that abuts against the second limiting part exists, and the fifth sensor detects that area of the first transmission part corresponding to the accommodating part carries the empty tray, the second limiting part is controlled to stay at the third position; and when the fourth sensor detects that no empty tray that abuts against the second limiting part exists, the second limiting part is controlled to stay at the third position.

The present application further provides a computer readable storage medium, storing an instruction, and the instruction, when executed on a computer, enables the computer to execute any tray separating method described above.

BRIEF DESCRIPTION OF THE DRAWINGS

FIG. 14 shows a tenth space diagram of a tray separating apparatus of an embodiment of the present invention.

FIG. 15 shows a flowchart of a tray separating method provided by an embodiment of the present application.

DETAILED DESCRIPTION

Figure 1:
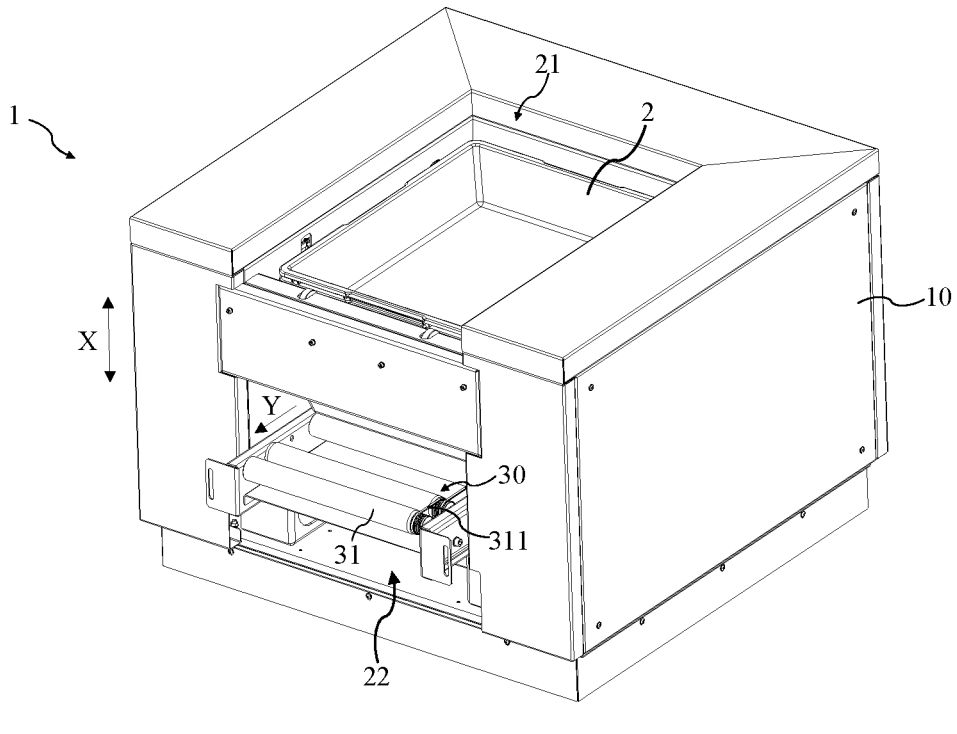
FIG. 1 shows a first space diagram of a tray separating apparatus of an embodiment of the present invention.

The implementation of the present invention is described below by specific detailed embodiments, and those skilled in the art can easily understand other advantages and effects of the present invention from the contents disclosed in the specification. Although the description of the present invention will be introduced in combination with preferred embodiments, it does not mean that the features of the present invention are limited to the implementation only. On the contrary, the purpose of introducing the invention in combination with the implementation is to cover other options or modifications that may be extended based on the claims of the present invention. In order to provide deep understanding of the present invention, many specific details will be included in the following description. The present invention can also be implemented without using these details. In addition, in order to avoid confusing or blurring the focus of the present invention, some specific details will be omitted in the description. It should be noted that the embodiments in the present invention and features in the embodiments can be combined with each other in the case of not conflicting.

It should be noted that in this specification, similar numerals and letters represent similar items in the following drawings. Therefore, once an item is defined in a drawing, it does not need to be further defined and explained in the subsequent drawings.

In the description of the embodiment, it should be noted that directional or positional relationships indicated by terms such as "upper", "lower", "inner" and "bottom" are based on directional or positional relationships as shown in the accompanying drawings, or directional or positional relationships that are commonly placed when the invention product is used, and are only for the purposes of facilitating describing the present invention and simplifying the description, rather than indicating or implying that the referred apparatus or element has to have a specific direction or be constructed and operated in the specific direction, and therefore, they cannot be regarded as limitations to the present invention.

The terms "first" and "second" are only used to distinguish descriptions, and cannot be understood as indicating or implying relative importance.

In the description of the embodiment, it should also be noted that the terms "arrange" and "connection" should be understood in a broad sense unless otherwise specified and defined. For example, "connection" may be fixed connection, detachable connection or integrated connection, and may be mechanical connection or electric connection. For those ordinary skilled in the art, the specific meanings of the above terms in the embodiment may be understood according to specific situations.

In order to make the objectives, technical solutions and advantages of the present invention clearer, the implementations of the present invention will be further described in detail below in combination with the accompanying drawings.

Referring to FIG. 1 to FIG. 8, the present application provides a tray separating apparatus 1, including: a main body 10, a tray inlet 21, a tray outlet 22, a first transmission part 30, a first limiting part 40 and a second limiting part 41. The main body 10 has an accommodating part 20, the accommodating part 20 is located on a supporting part 1a of the main body 10, and rollers 1b are arranged at a bottom of the supporting part 1a. In the present application, the accommodating part 20 extends in a first direction (as shown by a direction X in FIG. 1 to FIG. 7), and the accommodating part 20 is configured to receive empty trays 2 (namely empty luggage trays) placed from the tray inlet 21. Equivalently, the accommodating part 20 is of a cavity structure. Exemplarily, the first direction is a depth direction of the main body 10, namely a height direction of the main body 10.

The above tray inlet 21 is located at a top of the main body 10, and communicates with the accommodating part 20. The tray outlet 22 is located at a side of the main body 10, and communicates with the accommodating part 20. In the present application, the accommodating part 20 is in a square shape. The above first transmission part 30 is located at a bottom of the accommodating part 20, and is configured to carry the empty trays 2, and output the empty trays 2 in a second direction (as shown by a direction Y in FIG. 1 to FIG. 6) from the tray outlet 22, and the second direction is perpendicular to the first direction. Equivalently, the empty trays 2 may be collected into the accommodating part 20 of the tray separating apparatus 1 through the tray inlet 21, and then outputted by the first transmission part 30 from the tray outlet 22, such as transmitted to a security check machine for passengers to take and use.

In addition, the above first limiting part 40 and the second limiting part 41 are mounted on the main body 10, and in the first direction, the second limiting part 41 is located below the first limiting part 40. In the present application, the first limiting part 40 can be switched between a first position and a second position, and the second limiting part 41 can be switched between a third position and a fourth position.

When the first limiting part 40 stays at the first position, the first limiting part 40 can abut against an empty tray 2 placed from the tray inlet 21, so as to limit downward movement of the empty tray 2 in the first direction, and the empty tray 2 that abuts against the first limiting part 40 can be stacked with more than one empty tray 2 placed from the tray inlet 21.

That is, when the first limiting part 40 stays at the first position, after the empty trays 2 are transmitted to the accommodating part 20 from the tray inlet 21 (for example, the empty trays 2 are transmitted to the tray inlet 21 through the following second transmission part 50 (referring to FIG.

14)), the empty trays 2 fall into the accommodating part 20 in the first direction, and may abut against the first limiting part 40. The first limiting part 40 supports the empty trays 2, and the empty trays 2 may not continue to move downwards in the first direction (a direction towards the first transmission part 30). When the empty trays 2 are continuously transmitted to the accommodating part 20 from the tray inlet 21, the subsequent empty trays 2 may be stacked in the empty tray 2 that abuts against the first limiting part 40.

Figure 4:
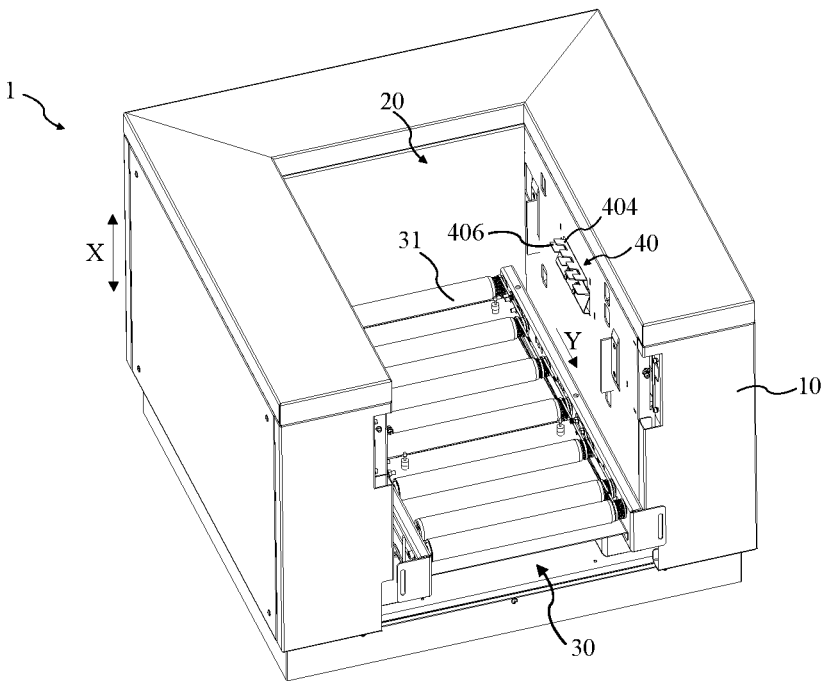
FIG. 4 shows a fourth space diagram of a tray separating apparatus of an embodiment of the present invention.
Figure 5:
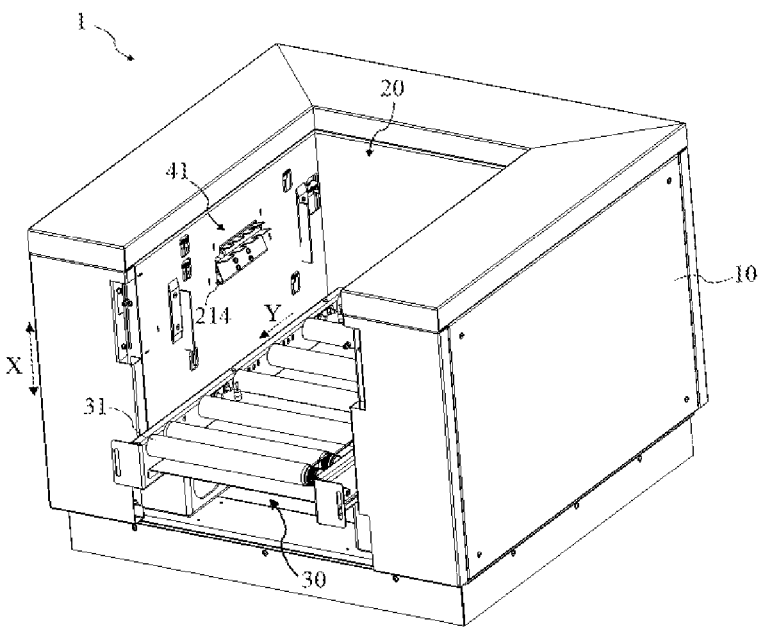
FIG. 5 shows a fifth space diagram of a tray separating apparatus of an embodiment of the present invention.
Figure 6:
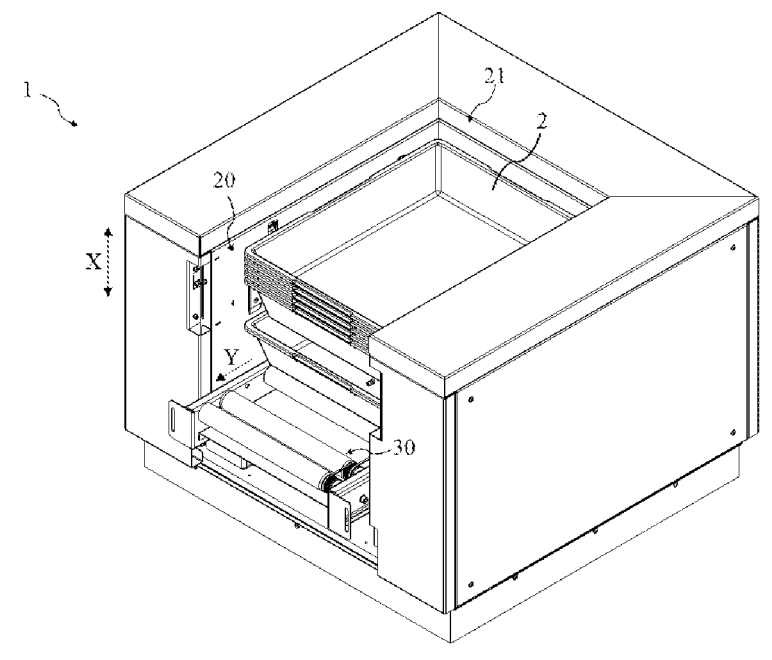
FIG. 6 shows a sixth space diagram of a tray separating apparatus of an embodiment of the present invention.
Figure 7:
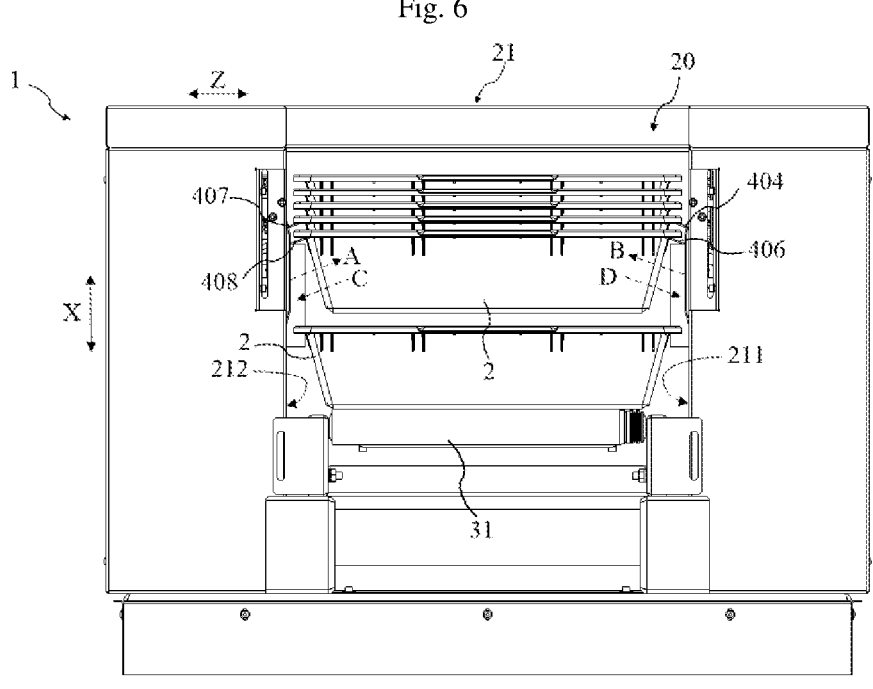
FIG. 7 shows a first side view of a tray separating apparatus of an embodiment of the present invention.

Exemplarily, as shown in FIG. 4 and FIG. 7, the first limiting part 40 abuts against one empty tray 2, and the empty tray 2 is stacked with three empty trays 2 in the first direction. Equivalently, the first limiting part 40 supports a total of four empty trays 2, and the first limiting part 40 abuts against a lowest empty tray 2 among the four empty trays 2. Therefore, when the first limiting part 40 stays at the first position, the first limiting part 40 may play a role in collecting and storing the empty trays 2.

When the first limiting part 40 stays at the second position, the first limiting part 40 can be separated from the empty trays 2 placed from the tray inlet 21, so as to enable the empty trays 2 to move downwards in the first direction.

That is, when the first limiting part 40 is switched to the second position from the first position, the first limiting part 40 may be separated from one empty tray 2 that abuts against the first limiting part 40, so that the empty tray 2 that abuts against the first limiting part 40 and all empty trays 2 stacked in the empty tray 2 may move downwards in the first direction. Also equivalently, the first limiting part 40 may not continue to support the empty trays 2. After the empty tray 2 that abuts against the first limiting part 40 is separated from the first limiting part 40, the empty tray 2 can abut against the second limiting part 41 located at the third position after moving downwards in the first direction, as described below.

When the second limiting part 41 stays at the third position, the second limiting part 41 can abut against the empty trays 2 placed from the tray inlet 21, so as to limit downward movement of the empty trays 2 in the first direction.

That is, when the second limiting part 41 stays at the third position, and after the empty trays 2 are transmitted to the accommodating part 20 from the tray inlet 21, the empty trays 2 fall into the accommodating part 20 in the first direction and abut against the second limiting part 41. When the second limiting part 41 stays at the third position, the first limiting part 40 may be controlled to stay at the second position from the first position. In this position state, there are at least two sources of empty trays 2 that abut against the second limiting part 41:

one possible implementation is that the tray separating apparatus 1 is in an initial state, the first limiting part 40 does not support any empty tray 2, that is, when the first limiting part 40 is switched to the second position from the first position, there will be no empty tray 2 that is separated from the first limiting part 40 falling down in the first direction to abut against the second limiting part 41; and the first limiting part 40 stays at the second position, downward movement of the empty trays 2 in the first direction may not be blocked, so that one empty tray 2 or multiple stacked empty trays 2 may be manually or automatically placed into the accommodating part 20 from the tray inlet 21, one or the multiple stacked empty trays 2 move downwards in the first direction to be supported by the second limiting part 41, and the lowest empty tray 2 abuts against the second limiting part 41.

In the embodiment, when the empty trays 2 are not collected in the accommodating part 20, the first limiting part 40 is controlled to stay at the second position, the second limiting part 41 is controlled to stay at the third position. And staff manually place one empty tray 2 into the accommodating part 20 to abut against the second limiting part 41, that is, the second limiting part 41 supports one empty tray 2; and then the empty trays 2 are manually or automatically transmitted into the accommodating part 20, and the multiple stacked empty trays 2 may be transmitted together or one by one. Since one empty tray 2 is placed on the second limiting part 41 in advance, the subsequent transmitted empty trays 2 may fall into the empty tray 2 placed in advance conveniently.

Another possible implementation is that as mentioned earlier, the first limiting part 40 supports one or more empty trays 2 when stay at the first position. When the first limiting part 40 is controlled to be switched to the second position from the first position, all empty trays 2 that abut against the first limiting part 40 may move downwards in the first direction to be supported by the second limiting part 41 after being separated from the first limiting part 40, and the lowest empty tray 2 abuts against the second limiting part 41.

Whether the empty tray 2 that abuts against the second limiting part 41 comes from the empty tray 2 that is separated from the first limiting part 40 or the empty tray 2 directly falling through the tray inlet 21, and after the second limiting part 41 abuts against one empty tray 2, other empty trays 2 stacked in the empty tray 2 are supported by the first limiting part 40. That is, the second limiting part 41 is controlled to still stay at the third position, and the first limiting part 40 is controlled to be switched to the first position from the second position. At this time, referring to FIG. 6 and FIG. 7, the second limiting part 41 abuts against one empty tray 2, and the first limiting part 40 abuts against one empty tray 2 above the empty tray 2. Exemplarily, as shown in FIG. 7, the first limiting part 40 supports four empty trays 2, and the second limiting part 41 supports one empty tray 2 and abuts against it.

Equivalently, the lowest empty tray 2 among all empty trays 2 placed into the accommodating part 20 from the tray inlet 21 is supported by the second limiting part 41, and other empty trays 2 are supported by the first limiting part 40. At this time, the second limiting part 41 may be controlled to be switched to the fourth position from the third position for tray separating, as described below.

Exemplarily, the first limiting part 40 at least supports one empty tray 2, and when the second limiting part 41 supports one empty tray 2, a tray separating operation may be performed. At this time, the second limiting part 41 is controlled to be switched to the fourth position from the third position, the first limiting part 40 is controlled to stay at the first position, and the second limiting part 41 can be separated from the empty trays 2 placed from the tray inlet 21, so as to enable one empty tray 2 to move downwards in the first direction to be borne by the first transmission part 30.

That is, during tray separating operation, the first limiting part 40 stays at the first position, the second limiting part 41 stays at the fourth position, one empty tray 2 supported by the second limiting part 41 may move downwards in the first direction to be borne by the first transmission part 30, and the first transmission part 30 outputs one empty tray 2 that is separated from the second limiting part 41 in a second direction (as shown by a direction Y in FIG. 1 to FIG. 6) from the tray outlet 22.

The first limiting part 40 is continuously controlled to be switched between the first position and the second position, and the second limiting part 41 is continuously controlled to be switched between the third position and the fourth position, when a tray separating condition is met (the first limiting part 40 at least supports one empty tray 2, and the second limiting part 41 supports one empty tray 2), the empty trays 2 collected into the accommodating part 20 of the tray separating apparatus 1 from the tray inlet 21 will be separated one by one, and then outputted by the first transmission part 30 from the tray outlet 22, and the empty trays 2 are transmitted to the passengers one by one for the passengers to take and place luggage for security checks.

Therefore, in the present application, in a process of tray separating by using the tray separating apparatus 1, the accommodating part 20 collects and stores the empty trays 2 after the passengers complete the security checks, when the first limiting part 40 supports at least one empty tray 2, and the second limiting part 41 also supports one empty tray 2, the second limiting part 41 is controlled to stay at the fourth position to perform the tray separating operation, so as to separate the stacked empty trays 2. The separated empty trays 2 one by one, instead of the stacked empty trays 2, are transmitted to the passengers. It is convenient for the passengers to take the empty trays 2 to place their luggage for security checks, and therefore security check efficiency is improved. Moreover, the labor intensity of the security staff is also reduced. The collection of the empty trays 2 and the tray separating operation of the empty trays 2 are completed through the tray separating apparatus 1, and working efficiency is improved.

In addition, when the first limiting part 40 stays at the first position, the empty trays 2 may be continuously collected; and the second limiting part 41 performs position switching to complete the tray separating operation, so that the tray separating apparatus 1 of the present application has both empty tray storage function and tray separating function. There is no need to collect the empty trays 2 one by one, and then separate them one by one, the tray separating process does not affect the empty tray collecting process, and the tray separating process and the empty tray collecting process may be performed synchronously, which improves efficiency of empty tray collection and efficiency of tray separating.

In some possible implementations, when the second limiting part 41 stays at the third position, the second limiting part 41 can abut against the empty tray 2 that is separated from the first limiting part 40; and when the second limiting part 41 stays at the fourth position, the second limiting part 41 can be separated from one empty tray 2 that is separated from the first limiting part 40. That is, the first limiting part 40 supports the lowest empty tray 2 when stay at the first position, after the first limiting part 40 is switched to the second position, the lowest empty tray 2 moves downwards in the first direction to abut against the second limiting part 41 stay at the third position after being separated from the first limiting part 40. When the second limiting part 41 is switched to the fourth position from the third position, the lowest empty tray 2 may also be separated from the second limiting part 41, and move downwards in the first direction to be borne by the first transmission part 30. And the first transmission part 30 outputs the lowest empty tray 2 from the tray outlet 22. The above operation is repeated, and the lowest empty trays 2 supported by the first limiting part 40 fall into the second limiting part 41 one by one, so as to complete the tray separating operation on all the empty trays 2 supported by the first limiting part 40.

In some possible implementations, when the second limiting part 41 stays at the third position, the second limiting part 41 can abut against one empty tray 2, and the empty tray 2 can be stacked with the other empty tray 2; and when the second limiting part 41 stays at the fourth position, the second limiting part 41 can be separated from the one empty tray 2. When the first limiting part 40 stays at the first position, the first limiting part 40 can abut against the other empty tray 2, and the other empty tray 2 can be stacked with more than one empty tray 2 placed from the tray inlet 21; and when the first limiting part 40 stays at the second position, the first limiting part 40 can be separated from the other empty tray 2, so as to enable the other empty tray 2 and the empty trays 2 stacked in the other empty tray 2 to move downwards in the first direction, and the other empty tray 2 can abut against the second limiting part 41.

That is, when the second limiting part 41 supports two empty trays 2 (one empty tray and the other empty tray), the first limiting part 40 is controlled to stay at the first position and the first limiting part 40 abuts against the other empty tray 2, then the other empty tray 2 supported by the first limiting part 40 may collect more than one empty tray 2 from the tray inlet 21, and the second limiting part 41 may be separated from one empty tray 2 to complete tray separating operation. Then, the first limiting part 40 is controlled to be switched to the second position to be separated from the other empty tray 2 that abuts against the first limiting part 40, so as to enable the other empty tray 2 and the empty trays 2 stacked in the other empty tray 2 to move downwards in the first direction, and then the other empty tray 2 abuts against the second limiting part 41. Then the above operation is repeated, and the first limiting part 40 is controlled to be switched to the first position from the second position, so as to abut against one empty tray 2 above the other empty tray 2; and then the second limiting part 41 is switched to the fourth position to be separated from the other empty tray 2. The above operation is continuously performed to complete the tray separating process.

Figure 8:
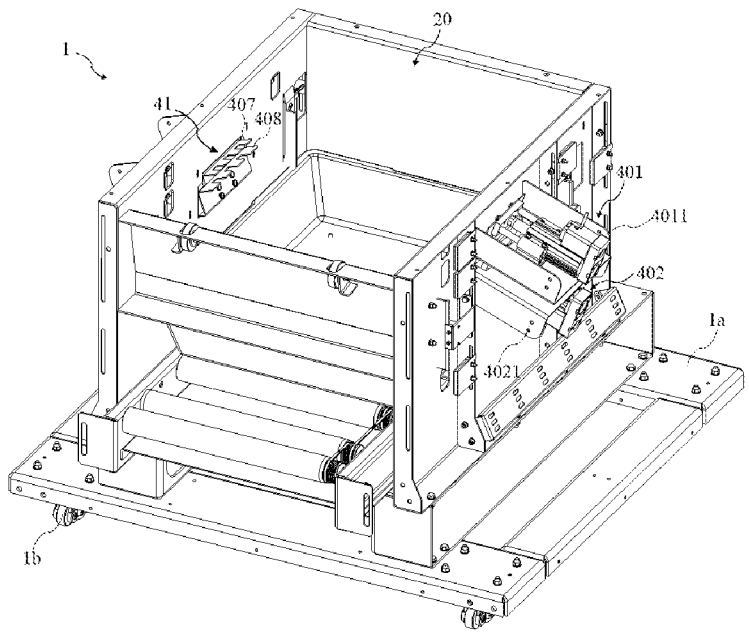
FIG. 8 shows a seventh space diagram of a tray separating apparatus of an embodiment of the present invention.

Referring to FIG. 7 and in conjunction with FIG. 4 and FIG. 8, in some possible implementations, the first limiting part 40 stays at the first position, and the first limiting part 40 abuts against one empty tray 2; and the second limiting part 41 stays at the third position, and the second limiting part 41 abuts against one empty tray 2; and the one empty tray 2 that abuts against the first limiting part 40 stays in the one empty tray 2 that abuts against the second limiting part 41. Before the first limiting part 40 is switched to the first position from the second position, more than one empty tray 2 may be stacked in the one empty tray 2 that abuts against the second limiting part 41. When the first limiting part 40 is switched to the first position, the first limiting part 40 directly abuts against the empty trays 2 located in the one empty tray 2 that abuts against the second limiting part 41, so that the one empty tray 2 below one empty tray 2 that abuts against the first limiting part 40 can complete the tray separating operation after being separated from the second limiting part 41.

Further referring to FIG. 1 to FIG. 7 and in conjunction with FIG. 8 to FIG. 13, in a third direction (as shown by a direction Z in FIG. 2, FIG. 3, FIG. 7 and FIG. 12), the accommodating part 20 includes a first part 211 and a second part 212 which are oppositely arranged, and the first part 211 and the second part 212 extend in the first direction respectively. The first part 211 and the second part 212 of the accommodating part 20 are equivalent to two opposite side walls of the accommodating part 20. In the present application, the first part 211 of the accommodating part 20 is provided with a first through hole 213, the second part 212 of the accommodating part 20 is provided with a second through hole 214, and the first direction, the second direction and the third direction are perpendicular to one another.

In a possible implementation, the first limiting part 40 includes: a first electric cylinder 401, mounted on one side of the main body 10 opposite to the first part 211 where the first electric cylinder 401 has a first telescopic piece 403, the first telescopic piece 403 is provided with a first clamping piece 404, and the first clamping piece 404 is located at the first through hole 213; and a second electric cylinder 411, mounted on one side of the main body 10 opposite to the second part 212, and spaced apart from the first electric cylinder 401 in the third direction, where the second electric cylinder 411 has a second telescopic piece, the second telescopic piece is provided with a second clamping piece 407, and the second clamping piece 407 is located at the second through hole 214.

Figure 9:
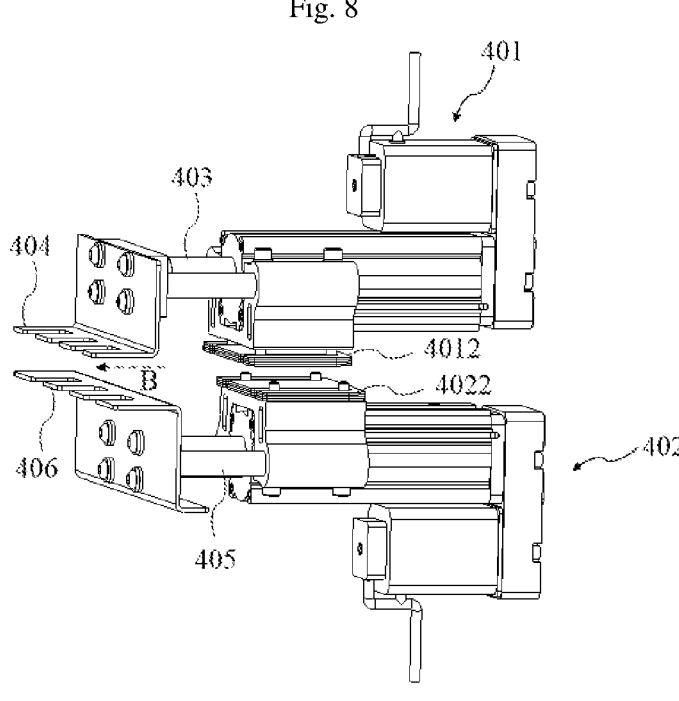
FIG. 9 shows a first space diagram of a first limiting part and a second limiting part in a tray separating apparatus of an embodiment of the present invention.
Figure 10:
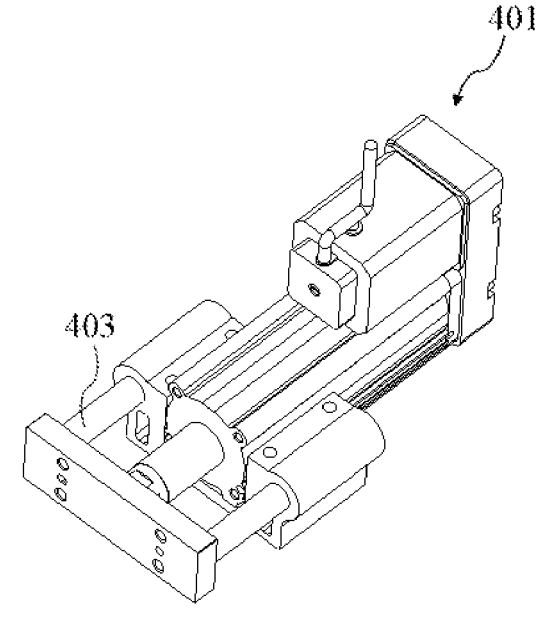
FIG. 10 shows a second space diagram of a first limiting part in a tray separating apparatus of an embodiment of the present invention.
Figure 11:
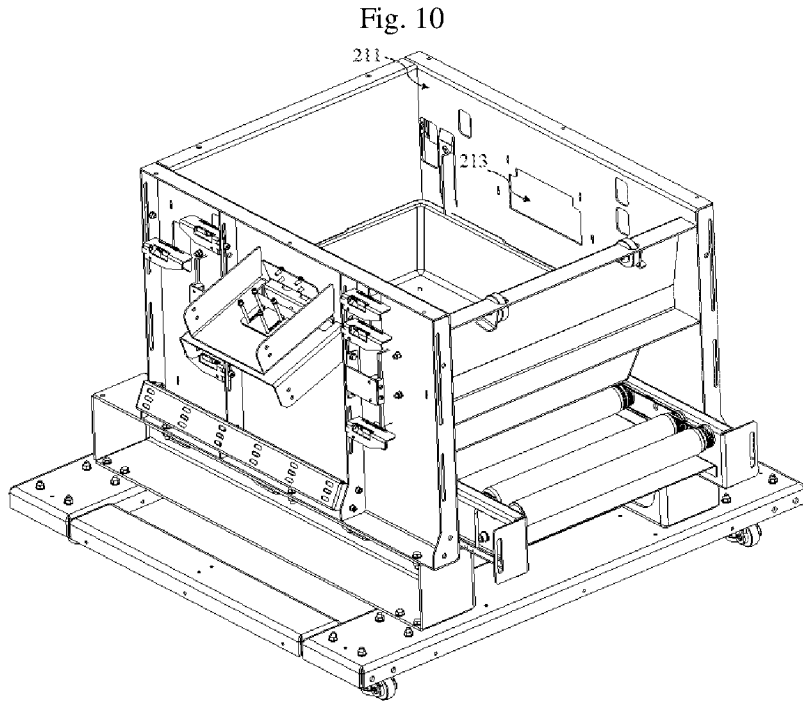
FIG. 11 shows an eighth space diagram of a tray separating apparatus of an embodiment of the present invention.
Figure 12:
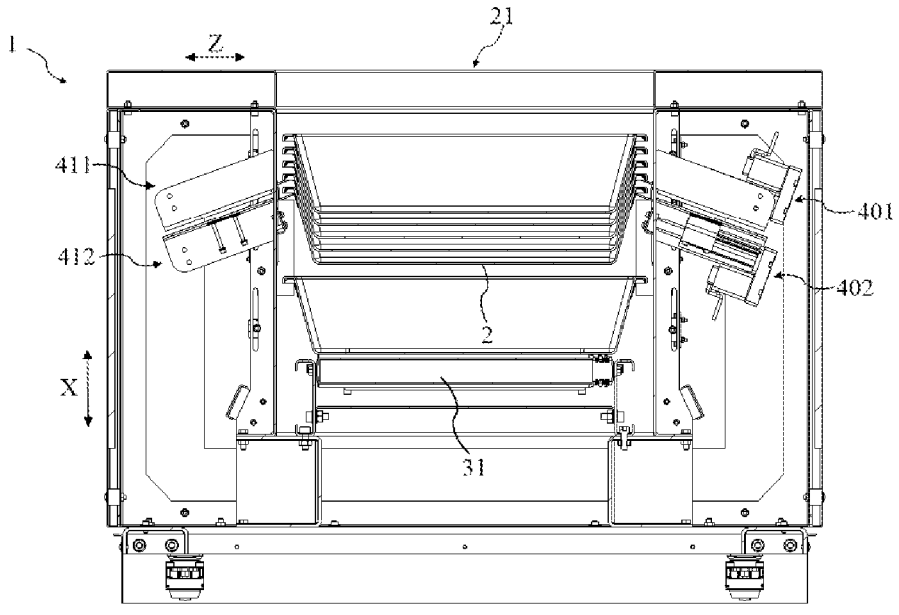
FIG. 12 shows a second side view of a tray separating apparatus of an embodiment of the present invention.

FIG. 9 shows structures of the first electric cylinder 401, the first telescopic piece 403 and the first clamping piece 404, and a structure of the second electric cylinder 411 is the same as the structure of the first electric cylinder 401, a structure of the second telescopic piece is the same as the structure of the first telescopic piece 403, and a structure of the second clamping piece 407 is the same as the structure of the first clamping piece 404. The first electric cylinder 401 works to drive the first telescopic piece 403 to telescope, so as to drive the first clamping piece 404 to telescope at the first through hole 213. Correspondingly, the second electric cylinder 411 works to drive the second telescopic piece to telescope, so as to drive the second clamping piece 407 to telescope at the second through hole 214.

In the present application, the second limiting part 41 includes: a third electric cylinder 402, mounted on the side of the main body 10 opposite to the first part 211, where the third electric cylinder 402 has a third telescopic piece 405, the third telescopic piece 405 is provided with a third clamping piece 406, and the third clamping piece 406 is located at the first through hole 213; and a fourth electric cylinder 412, mounted on the side of the main body opposite to the second part 212, and spaced apart from the third electric cylinder 402 in the third direction, where the fourth electric cylinder 412 has a fourth telescopic piece, the fourth telescopic piece is provided with a fourth clamping piece 408, and the fourth clamping piece 408 is located at the second through hole 214. As shown in FIG. 4, the first clamping piece 404 and the third clamping piece 406 are both located at the first through hole 213, and as shown in FIG. 8, the second clamping piece 407 and the fourth clamping piece 408 are both located at the second through hole 214.

FIG. 9 shows structures of the third electric cylinder 402, the third telescopic piece 405 and the third clamping piece 406, and a structure of the fourth electric cylinder 412 is the same as the structure of the third electric cylinder 402, a structure of the fourth telescopic piece is the same as the structure of the third electric cylinder 402, and a structure of the fourth clamping piece 408 is the same as the structure of the third clamping piece 406. The third electric cylinder 402 works to drive the third telescopic piece 405 to telescope, so as to drive the third clamping piece 406 to telescope at the first through hole 213. Correspondingly, the fourth electric cylinder 412 works to drive the fourth telescopic piece to telescope, so as to drive the fourth clamping piece 408 to telescope at the second through hole 214.

Exemplarily, when the first limiting part 40 stays at the first position, the first clamping piece 404 extends out of the first through hole 213, and the second clamping piece 407 extends out of the second through hole 214. When the first limiting part 40 stays at the second position, the first clamping piece 404 is in a retraction state, and the second clamping piece 407 is in a retraction state. Exemplarily, when the first limiting part 40 stays at the second position, the first clamping piece 404 retracts to be located at an outer side of the first part 211, and the second clamping piece 407 retracts to be located at an outer side of the second part 212.

Exemplarily, when the second limiting part 41 stays at the third position, the third clamping piece 406 extends out of the first through hole 213, and the fourth clamping piece 408 extends out of the second through hole 214. When the second limiting part 41 stays at the fourth position, the third clamping piece 406 is in a retraction state, and the fourth clamping piece 408 is in a retraction state. Exemplarily, when the second limiting part 41 stays at the third position, the third clamping piece 406 retracts to be located at the outer side of the first part 211, and the fourth clamping piece 408 retracts to be located at the outer side of the second part 212.

Specifically, in conjunction with FIG. 7, when the first limiting part 40 stays at the first position described in the above embodiment, the first telescopic piece 403 and the second telescopic piece can move in a direction towards the accommodating part 20 (as shown by a direction A and a direction B in FIG. 7), so that the first clamping piece 404 extends into the accommodating part 20 through the first through hole 213 to abut against one side of one empty tray 2, and the second clamping piece 407 extends into the accommodating part 20 through the second through hole 214 to abut against the other side of the empty tray 2, so as to limit downward movement of the empty tray 2 in the first direction. That is, when the first limiting part 40 stays at the first position, the first clamping piece 404 and the second clamping piece 407 support two opposite sides of the same empty tray 2 respectively.

When the first limiting part 40 stays at the second position described in the above embodiment, the first telescopic piece 403 and the second telescopic piece can move in a direction away from the accommodating part 20 (as shown by a direction C and a direction D in FIG. 7), so that the first clamping piece 404 retracts through the first through hole 213 to be separated from one side of one empty tray 2, and the second clamping piece 407 retracts through the second through hole 214 to be separated from the other side of the empty tray 2, so as to enable the empty tray 2 to move downwards in the first direction. That is, when the first limiting part 40 stays at the second position, the first clamping piece 404 and the second clamping piece 407 are separated from the two opposite sides of the same empty tray 2 respectively.

When the second limiting part 41 stays at the third position described in the above embodiment, the third telescopic piece 405 and the fourth telescopic piece can move in the direction towards the accommodating part 20 (as shown by the direction A and the direction B in FIG. 7), so that the third clamping piece 406 extends into the accommodating part 20 through the first through hole 213 to abut against one side of one empty tray 2, and the fourth clamping piece 408 extends into the accommodating part 20 through the second through hole 214 to abut against the other side of the empty tray 2, so as to limit downward movement of the empty tray 2 in the first direction. That is, when the second limiting part 41 stays at the third position, the third clamping piece 406 and the fourth clamping piece 408 support the two opposite sides of the same empty tray 2 respectively.

When the second limiting part 41 stays at the fourth position described in the above embodiment, the third telescopic piece 405 and the fourth telescopic piece can move in the direction away from the accommodating part 20 (as shown by the direction C and the direction D in FIG. 7), so that the third clamping piece 406 retracts through the first through hole 213 to be separated from one side of one empty tray 2, and the fourth clamping piece 408 retracts through the second through hole 214 to be separated from the other side of the empty tray 2, so as to enable the empty tray 2 to move downwards in the first direction to be borne by the first transmission part 30. That is, when the second limiting part 41 stays at the fourth position, the third clamping piece 406 and the fourth clamping piece 408 are separated from the two opposite sides of the same empty tray 2 respectively to complete tray separating operation, and the empty tray 2 is outputted by the first transmission part 30 from the tray outlet 22 for the passengers to take and place their luggage for security checks.

It should be noted that the structures of the first limiting part 40 and the second limiting part 41 of the present application are not limited to this, and structures of limiting parts that can realize switching among the first position, the second position, the third position and the fourth position above are all within the protection scope of the present application. For example, the first limiting part 40 and the second limiting part 41 are of electric push rod structures respectively.

Further referring to FIG. 7, in the present application, the first clamping piece 404 is arranged parallel to the third clamping piece 406, and the second clamping piece 407 is arranged parallel to the fourth clamping piece 408.

In some possible implementations, the first clamping piece 404 and the third clamping piece 406 extend towards a top of the accommodating part 20 in a fourth direction (as shown by the direction B in FIG. 7), and the second clamping piece 407 and the fourth clamping piece 408 extend towards the top of the accommodating part 20 in a fifth direction (as shown by the direction A in FIG. 7). An included angle between the fourth direction and the first direction (as shown by a direction X in FIG. 7) is a first acute angle, and an included angle between the fifth direction and the first direction is a second acute angle, and the first acute angle is equal to the second acute angle. After such settings, it is convenient for the first clamping piece 404, the second clamping piece 407, the third clamping piece 406 and the fourth clamping piece 408 to support the corresponding empty trays 2 well when they are in an extension state. Exemplarily, numerical values of the first acute angle and the second acute angle are between 0° and 45°.

In some possible implementations, as shown in FIG. 4, and FIG. 7 to FIG. 9, the first clamping piece 404, the second clamping piece 407, the third clamping piece 406 and the fourth clamping piece 408 of the present application are in a sheet shape respectively. When the first limiting part 40 stays at the first position, the first clamping piece 404 and the second clamping piece 407 can abut against an outer edge of one empty tray 2; and when the second limiting part 41 stays at the third position, the third clamping piece 406 and the fourth clamping piece 408 can abut against the outer edge of one empty tray 2.

As mentioned earlier, the first limiting part 40 stays at the first position, and the first limiting part 40 abuts against one empty tray 2; the second limiting part 41 stays at the third position, and the second limiting part 41 abuts against one empty tray 2; and the empty tray 2 that abuts against the first limiting part 40 is located in the empty tray 2 that abuts against the second limiting part 41. In the present application, in the first direction, a distance between the first clamping piece 404 and the third clamping piece 406, and a distance between the second clamping piece 407 and the fourth clamping piece 408 meet following requirement: an outer edge of a lower empty tray 2 in any two adjacent stacked empty trays 2 can abut against the third clamping piece 406 and the fourth clamping piece 408, and an outer edge of an upper empty tray 2 in the any two adjacent stacked empty trays 2 can abut against the first clamping piece 404 and the second clamping piece 407.

After such settings, when multiple empty trays 2 are supported by the third clamping piece 406 and the fourth clamping piece 408 which stay at the third position, the third clamping piece 406 and the fourth clamping piece 408 abut against the outer edge of the lowest empty tray 2 (namely the lower empty tray 2) among the multiple empty trays 2, at this time, when the first clamping piece 404 and the second clamping piece 407 are controlled to be switched to the first position, the first clamping piece 404 and the second clamping piece 407 may exactly abut against the outer edge of one empty tray 2 (namely the upper empty tray 2) above the lowest empty tray 2 (namely the lower empty tray 2).

Alternatively, when there is no empty tray 2 that abuts against the third clamping piece 406 and the fourth clamping piece 408, the first clamping piece 404 and the second clamping piece 407 abut against the outer edge of the lowest empty tray 2 (namely the lower empty tray 2) among the multiple empty trays 2, at this time, when the first clamping piece 404 and the second clamping piece 407 are controlled to be switched to the second position, the multiple empty trays 2 move downwards in the first direction to be supported by the third clamping piece 406 and the fourth clamping piece 408 which stay at the third position; and the third clamping piece 406 and the fourth clamping piece 408 abut against the outer edge of the lowest empty tray 2 (namely the lower empty tray 2) among the multiple empty trays 2, at this time, when the first clamping piece 404 and the second clamping piece 407 are controlled to be switched to the first position again, the first clamping piece 404 and the second clamping piece 407 may exactly abut against the outer edge of one empty tray 2 (namely the upper empty tray 2) above the lowest empty tray 2 (namely the lower empty tray 2). The above tray separating operation is conveniently completed.

Exemplarily, referring to FIG. 8 and FIG. 9, the first electric cylinder 401 of the present application is mounted on one side of the main body 10 opposite to the first part 211 through a first mounting part 4011, and the third electric cylinder 402 is mounted on one side of the main body 10 opposite to the first part 211 through a second mounting part 4021. Similarly, the second electric cylinder 411 of the present application is mounted on the side of the main body 10 opposite to the second part 212 through a third mounting part (with the same structure as the first mounting part 4011), and the fourth electric cylinder 412 is mounted on the side of the main body 10 opposite to the second part 212 through a fourth mounting part (with the same structure as the second mounting part 4021).

Specifically, the first electric cylinder 401 is mounted on the first mounting part 4011 through a first gasket 4012, and the third electric cylinder 402 is mounted on the second mounting part 4021 through a second gasket 4022. The second electric cylinder 411 is mounted on the third mounting part through a third gasket (with the same structure as the first gasket 4012), and the fourth electric cylinder 412 is mounted on the fourth mounting part through a fourth gasket (with the same structure as the second gasket 4022).

By changing the quantity of the first gasket 4012 (increasing or decreasing), a height of the first electric cylinder 401 mounted on the first mounting part 4011 may be changed, that is, a distance of the first electric cylinder 401 in the first direction is changed. Equivalently, the distance of the first electric cylinder 401 in the first direction is adjusted (increased or decreased) by adjusting the quantity of the first gasket 4012, so as to change a height of the first clamping piece 404 in the first direction. By changing the quantity of the third gasket (increasing or decreasing), a height of the second electric cylinder 411 mounted on the third mounting part may be changed, that is, a distance of the second electric cylinder 411 in the first direction is changed. Equivalently, the distance of the second electric cylinder 411 in the first direction is adjusted (increased or decreased) by adjusting the quantity of the third gasket, so as to change a height of the second clamping piece 407 in the first direction.

Equivalently, a height of the first limiting part 40 in the first direction is adjustable. After such settings, it may be ensured that when the first limiting part 40 stays at the first position, the first clamping piece 404 and the second clamping piece 407 can abut against an outer edge of one empty tray 2. Processing errors of the empty trays 2 or processing errors of the first limiting part 40 will not cause the first clamping piece 404 and the second clamping piece 407 to be unable to abut against the outer edge of one empty tray 2.

Similarly, by changing the quantity of the second gasket 4022 (increasing or decreasing), a height of the third electric cylinder 402 mounted on the second mounting part 4021 may be changed, that is, a distance of the third electric cylinder 402 in the first direction is changed. Equivalently, the distance of the third electric cylinder 402 in the first direction is adjusted (increased or decreased) by adjusting the quantity of the second gasket 4022, so as to change a height of the third clamping piece 406 in the first direction. By changing the quantity of the fourth gasket (increasing or decreasing), a height of the fourth electric cylinder 412 mounted on the fourth mounting part may be changed, that is, a distance of the fourth electric cylinder 412 in the first direction is changed. Equivalently, the distance of the fourth electric cylinder 412 in the first direction is adjusted (increased or decreased) by adjusting the quantity of the fourth gasket, so as to change a height of the fourth clamping piece 408 in the first direction.

Equivalently, a height of the second limiting part 41 in the first direction is adjustable. After such settings, when the second limiting part 41 stays at the third position, the third clamping piece 406 and the fourth clamping piece 408 can abut against an outer edge of one empty tray 2. Processing errors of the empty trays 2 or processing errors of the second limiting part 41 will not cause the third clamping piece 406 and the fourth clamping piece 408 to be unable to abut against the outer edge of one empty tray 2.

Moreover, it may be ensured that in the first direction, the distance between the first clamping piece 404 and the third clamping piece 406, and the distance between the second clamping piece 407 and the fourth clamping piece 408 meet following requirement: the outer edge of the lower empty tray 2 in any two adjacent stacked empty trays 2 can abut against the third clamping piece 406 and the fourth clamping piece 408, and the outer edge of the upper empty tray 2 in the any two adjacent stacked empty trays 2 can abut against the first clamping piece 404 and the second clamping piece 407.

Figure 2:
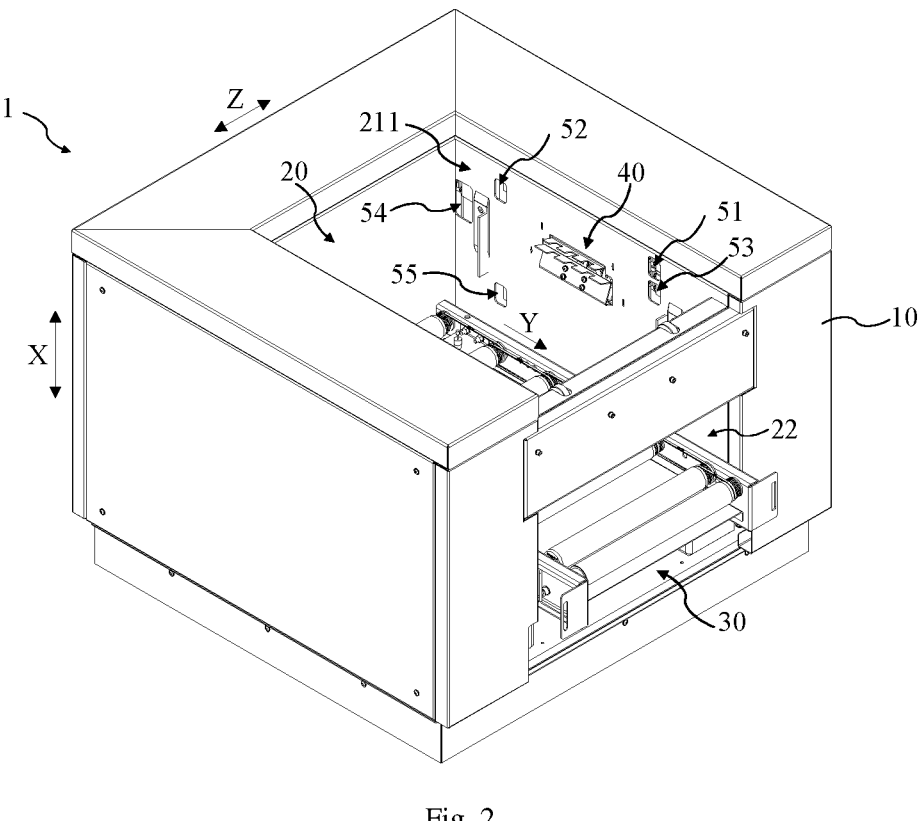
FIG. 2 shows a second space diagram of a tray separating apparatus of an embodiment of the present invention.
Figure 3:
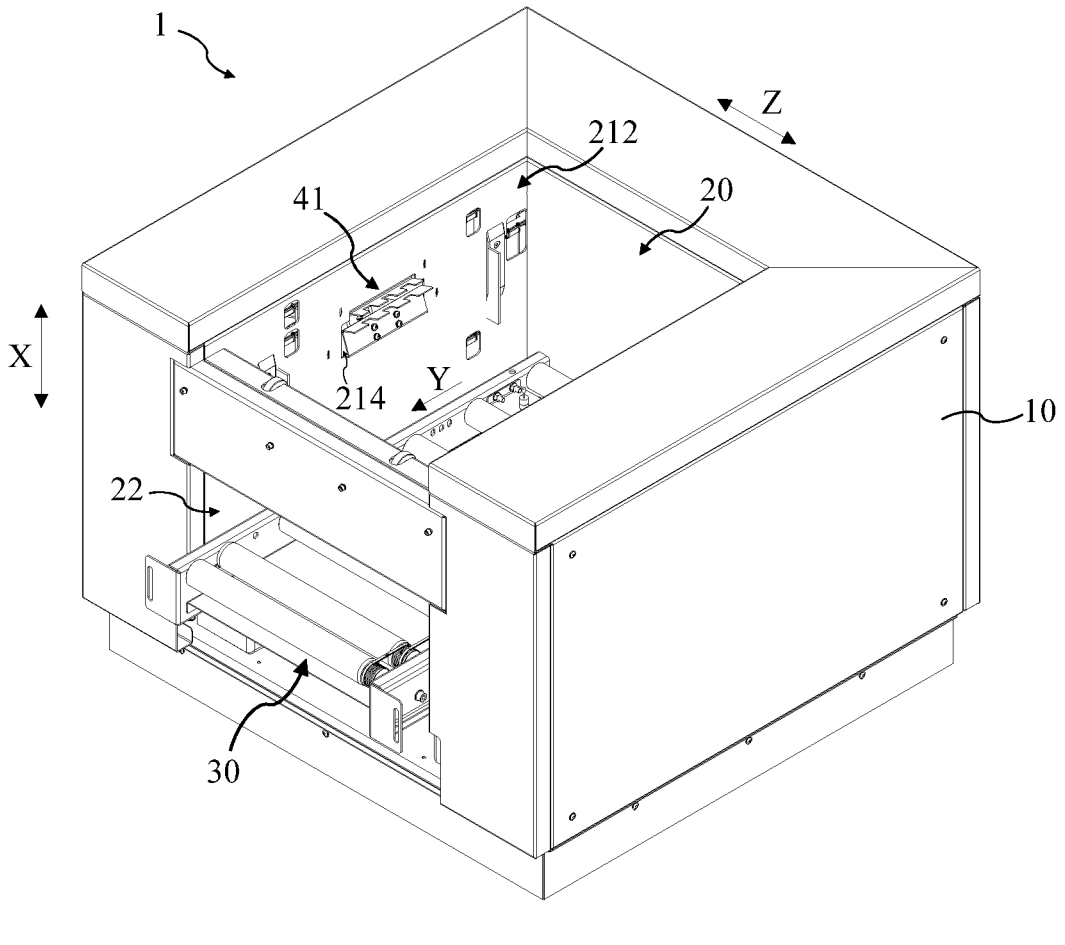
FIG. 3 shows a third space diagram of a tray separating apparatus of an embodiment of the present invention.
Figure 13:
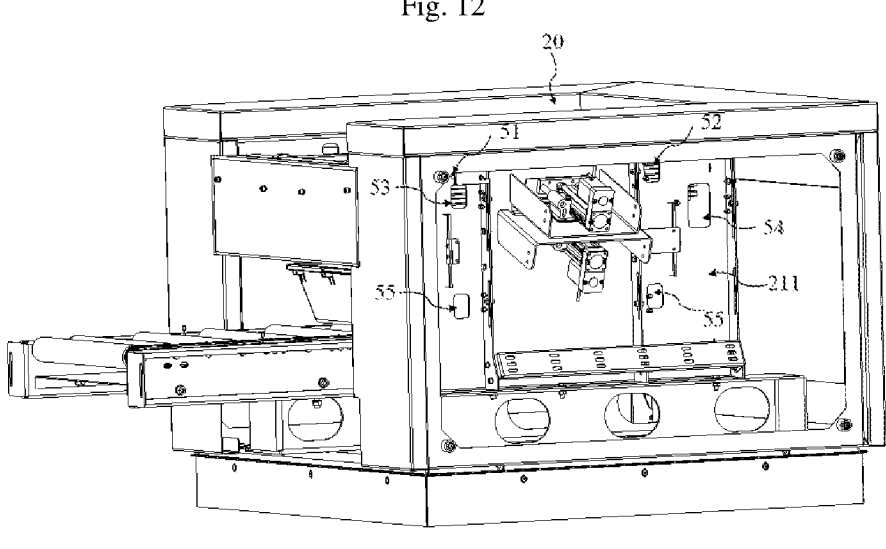
FIG. 13 shows a ninth space diagram of a tray separating apparatus of an embodiment of the present invention.

Further referring to FIG. 2 and FIG. 13, the tray separating apparatus 1 of the present application further includes: a first detection hole 51, a second detection hole 52, a third detection hole 53, a fourth detection hole 54 and a fifth detection hole 55. The first detection hole 51, the second detection hole 52, the third detection hole 53, the fourth detection hole 54 and the fifth detection hole 55 all communicate with the accommodating part 20, and the first detection hole 51, the second detection hole 52, the third detection hole 53, the fourth detection hole 54 and the fifth detection hole 55 can expose empty trays 2 at corresponding positions in the accommodating part 20 respectively. Exemplarily, the first part 211 and the second part 212 of the accommodating part 20 are respectively provided with the first detection hole 51, the second detection hole 52, the third detection hole 53, the fourth detection hole 54 and the fifth detection hole 55.

Specifically, the first detection hole 51 of the present application is provided with a first sensor, the first sensor is configured to detect whether an empty tray 2 exists at a first height, and in the first direction, the first height is higher than a height of a position where the first limiting part 40 is located. That is, the first sensor is configured to detect whether the quantity of the empty trays 2 supported by the first limiting part 40 exceeds the allowed quantity. That is, the first sensor is configured to detect whether the empty trays 2 collected in the accommodating part 20 overflow, and if yes, an alarm will be given. A situation that the second limiting part 41 cannot separate trays in time or be abnormal in tray separating, resulting in the increasing quantity of the empty trays 2 supported by the first limiting part 40 is prevented.

Exemplarily, in a process of collecting the empty trays 2 by the accommodating part 20 of the present application, the staff may manually place the empty trays 2 into the accommodating part 20. For example, it reaches the first height after the first limiting part 40 supports five empty trays 2, and at this time, if the first sensor detects that the empty tray 2 exists at the first height, the empty trays 2 cannot be manually placed into the accommodating part 20 continuously. After the first limiting part 40 supports four empty trays 2, and at this time, if the first sensor detects that no empty tray 2 exists at the first height, one empty tray 2 may be manually placed into the accommodating part 20 continuously. The quantity of the empty trays 2 collected at the above first height is not limited to this, and is correspondingly set according to actual demands.

The above second detection hole 52 is provided with a second sensor, the second sensor is configured to detect whether an empty tray exists at a second height, the second height is smaller than the first height, and the second height is higher than the height of the position where the first limiting part 40 is located. In the present application, the second sensor is also configured to detect whether the quantity of the empty trays 2 supported by the first limiting part 40 exceeds the allowed quantity. The difference is that if the second sensor detects that the empty tray 2 exists at the second height, the empty trays 2 cannot be automatically placed into the accommodating part 20 continuously.

For example, the following second transmission part 50 is controlled to stop transmitting the empty trays 2 into the accommodating part 20. For example, it reaches the second height after the first limiting part 40 supports four empty trays 2, and at this time, if the second sensor detects that the empty tray 2 exists at the second height, the empty trays 2 cannot be automatically placed into the accommodating part 20 continuously. After the first limiting part 40 supports three empty trays 2, and at this time, if the second sensor detects that no empty tray 2 exists at the second height, one empty tray 2 may be automatically placed into the accommodating part 20 continuously. The quantity of the empty trays 2 collected at the above second height is not limited to this, and is correspondingly set according to the actual demands.

The above third detection hole 53 is provided with a third sensor, and the third sensor is configured to detect whether an empty tray 2 that abuts against the first limiting part 40 exists. On the one hand, after the third sensor detects that the empty tray 2 that abuts against the first limiting part 40 exists, the first limiting part 40 may be controlled to be switched to the second position from the first position, so as to provide the empty tray 2 to the second limiting part 41 to perform tray separating operation. On the other hand, after the third sensor detects that no empty tray 2 that abuts against the first limiting part 40 exists, the second transmission part 50 may be controlled to continue to transmit the empty trays 2 to the accommodating part 20; and the first limiting part 40 may further be controlled to be switched to the first position from the second position, so as to abut against the empty trays 2.

The above fourth detection hole 54 is provided with a fourth sensor, and the fourth sensor is configured to detect whether an empty tray 2 that abuts against the second limiting part 41 exists. After the fourth sensor detects that the empty tray 2 that abuts against the second limiting part 41 exists, the second limiting part 41 may be controlled to be switched to the fourth position from the third position, so as to perform the tray separating operation. After the fourth sensor detects that no empty tray 2 that abuts against the second limiting part 41 exists, the second limiting part 41 may be controlled to be switched to the third position from the fourth position, so as to receive a new empty tray 2 to complete the tray separating operation.

The above fifth detection hole 55 is provided with a fifth sensor, and the fifth sensor is configured to detect whether an area of the first transmission part 30 corresponding to the accommodating part 20 carries an empty tray 2. Exemplarily, the area of the first transmission part 30 corresponding to the accommodating part 20 is the area where projections of the first transmission part 30 and the accommodating part 20 downwards in the first direction coincide.

After the second limiting part 41 is switched to the fourth position from the third position, the empty tray 2 that is separated from the second limiting part 41 will fall onto the first transmission part 30 in the first direction. when the fifth sensor detects that the area of the first transmission part 30 corresponding to the accommodating part 20 carries the empty tray 2, it indicates that the empty tray 2 has not yet been fully transmitted, and at this time, the second limiting part 41 stays at the third position and does not separate the trays. When the fifth sensor detects that the area of the first transmission part 30 corresponding to the accommodating part 20 carries no empty tray 2, the second limiting part 41 may be controlled to stay at the fourth position to separate the trays.

In some possible implementations, each sensor can emit laser rays to the outer edges of the empty trays 2 for corresponding detection. In such settings, detection accuracy of each sensor may be improved.

In some possible implementations, as shown in FIG. 13, the quantity of the fifth detection hole 55 is two, each fifth detection hole 55 is provided with one fifth sensor, and the two fifth sensors are arranged in the second direction at an interval, and correspond to the area of the first transmission part 30 corresponding to the accommodating part 20; and in the second direction, a detection distance between the two fifth sensors is a first numerical value, a width of the area of the first transmission part 30 corresponding to the accommodating part 20 is a second numerical value, and a difference value between the first numerical value and the second numerical value is within a set range.

Equivalently, the tray separating apparatus 1 is provided with two fifth sensors. In such settings, whether the area of the first transmission part 30 corresponding to the accommodating part 20 carries an empty tray 2 may be accurately detected. A situation that detection dead corners exist, which may cause the fifth sensors to feed back that the area of the first transmission part 30 corresponding to the accommodating part 20 carries no empty tray 2, but actually the area carries the empty tray 2, resulting in incorrect tray separating operation of the second limiting part 41 and collision with the empty tray 2 on the first transmission part 30 that has not yet been fully transmitted from the tray outlet 22, thereby causing the failure of the tray separating apparatus 1 is prevented.

In some possible implementations, the first numerical value is equal to the second numerical value. That is, the detection distance between the two fifth sensors is equal to the width of the area of the first transmission part 30 corresponding to the accommodating part 20.

In some possible implementations, the above first transmission part 30 includes: multiple electric rollers 31 distributed in the second direction. All the electric rollers 31 are in driving connection with one another through a belt 311. The empty trays 2 that are separated from the second limiting part 41 fall onto the electric rollers 31 and are transmitted by the electric rollers 31.

In some possible implementations, referring to FIG. 14, the tray separating apparatus 1 further includes a second transmission part 50, spaced apart from and parallel to the first transmission part 30 in the first direction (as shown by a direction X in FIG. 14), where the second transmission part 50 is configured to transmit empty trays 2 to the tray inlet 21 (a direction M in FIG. 14 shows a transmission direction). Exemplarily, a structure of the second transmission part 50 is the same as the structure of the first transmission part 30, that is, the second transmission part 50 includes: multiple electric rollers 50a distributed in the second direction.

The present application further provides a security check system, including the tray separating apparatus described in any above embodiment.

Referring to FIG. 15, the present application further provides a tray separating method, adopting the tray separating apparatus 1 described in any above embodiment, and including the following steps:

S101: a first limiting part 40 is controlled to stay at a second position, and a second limiting part 41 is controlled to stay at at a third position.

In the present application, when the tray separating apparatus 1 is in an initial state (that is, when the tray separating operation is not performed), the first limiting part 40 stays at a first position, and the second limiting part 41 stays at the third position. For example, the above first clamping piece 404, the second clamping piece 407, the third clamping piece 406 and the fourth clamping piece 408 are all in an extension state.

When the tray separating operation needs to be performed, the first limiting part 40 is controlled to stay at the second position, the second limiting part 41 is controlled to stay at the third position, empty trays 2 are transmitted to the tray inlet 21 of the accommodating part 20, the second limiting part 41 abuts against one empty tray 2 placed from the tray inlet 21, and the empty tray 2 that abuts against the second limiting part 41 is stacked with at least one empty tray 2.

Exemplarily, the staff manually place one empty tray 2 into the accommodating part 20 in advance, and the empty tray 2 may be supported on the second limiting part 41. Then, the second transmission part 50 is controlled to transmit the empty tray 2 to the accommodating part 20, at this time, the first limiting part 40 stays at the second position, and at least one empty tray 2 transmitted by the second transmission part 50 to the tray inlet 21 moves downwards in the first direction, and is stacked in the empty tray 2 that abuts against the second limiting part 41. One empty tray 2 is placed in the accommodating part 20 in advance, and it is convenient for the subsequent empty trays 2 to fall into the accommodating part 20 stably, and be stacked in one empty tray placed in advance. Equivalently, the empty tray placed in advance plays a role in guiding to collect the empty trays.

S102: the first limiting part 40 is controlled to stay at the first position, and the second limiting part 41 is controlled to stay at the third position.

After the second limiting part 41 supports at least two empty trays 2, the first limiting part 40 is controlled to stay at the first position, and the second limiting part 41 is controlled to stay at the third position. Exemplarily, the first limiting part 40 abuts against the empty trays 2 stacked in the empty tray 2 that abuts against the second limiting part 41. The second transmission part 50 may continue to transmit the empty trays 2 to the tray inlet 21, and the empty tray 2 that abuts against the first limiting part 40 can be stacked with more than one empty tray 2 placed from the tray inlet 21.

At this time, the first limiting part 40 at least supports one empty tray 2, and the second limiting part 41 supports one empty tray 2, so as to perform the tray separating operation.

S103: the first limiting part 40 is controlled to stay at the first position, and the second limiting part 41 is controlled to stay at a fourth position.

During tray separating, the first limiting part 40 stays at the first position, the second limiting part 41 stays at the fourth position, one empty tray 2 that abuts against the second limiting part 41 is separated from the second limiting part 41, and moves downwards in the first direction to be borne by the first transmission part 30, and the first transmission part 30 outputs the empty tray 2 in the second direction from the tray outlet 22, so as to complete the tray separating operation once.

S104: the first limiting part 40 is controlled to stay at the first position, and the second limiting part 41 is controlled to stay at the third position.

When the second limiting part 41 stays at the fourth position, and after completing the tray separating operation, it is necessary to perform a new tray separating operation. At this time, the first limiting part 40 is controlled to stay at the first position, and the second limiting part 41 is controlled to stay at the third position. After the second limiting part 41 is switched to the third position, the empty trays 2 supported by the first limiting part 40 can be received again, that is, it is necessary to control the first limiting part 40 to transmit new empty trays 2 to the second limiting part 41.

S105: the first limiting part 40 is controlled to stay at the second position, and the second limiting part 41 is controlled to stay at the third position.

The first limiting part 40 is controlled to stay at the second position, the second limiting part 41 is controlled to stay at the third position, and all empty trays 2 that abut against the first limiting part 40 are separated from the first limiting part 40, and move downwards in the first direction to abut against the second limiting part 41. At this time, all the empty trays 2 supported by the first limiting part 40 are changed to be supported by the second limiting part 41. The second limiting part 41 abuts against a lowest empty tray 2 among all the empty trays 2, the next step is to perform the tray separating operation on the lowest empty tray 2, and other empty trays 2 need to be supported by the first limiting part 40 continuously. Therefore, it is necessary to control the first limiting part 40 to be switched to the first position.

S106: the first limiting part 40 is controlled to stay at the first position, and the second limiting part 41 is controlled to stay at the third position.

The tray separating operation is to operate the stacked empty trays 2 one by one, that is, to separate the empty trays one by one from the second limiting part 41. That is to say, when the second limiting part 41 performs the tray separating operation, it supports one empty tray 2, and other empty trays 2 are supported by the first limiting part 40. Therefore, the first limiting part 40 is controlled to stay at the first position, the second limiting part 41 is controlled to stay at the third position, and the first limiting part 40 abuts against the empty trays 2 stacked in the empty tray 2 that abuts against the second limiting part 41. At this time, the second limiting part 41 supports one empty tray 2, and other empty trays 2 are supported by the first limiting part 40.

In this state, the second limiting part 41 may continue to perform the tray separating operation. That is, the first limiting part 40 is controlled to stay at the first position, and the second limiting part 41 is controlled to stay at the fourth position. That is, above S103 is repeated, and then above S104 to S106 are repeated.

Therefore, after continuously repeating above S103 to S106, multiple tray separating operations are completed. The first limiting part 40 is continuously controlled to be switched between the first position and the second position (for example, a first electric cylinder 401 is controlled to drive a first clamping piece 404 to telescope, and a second electric cylinder 411 is controlled to drive a second clamping piece 407 to telescope), the second limiting part 41 is continuously controlled to be switched between the third position and the fourth position (for example, a third electric cylinder 402 is controlled to drive a third clamping piece 406 to telescope, and a fourth electric cylinder 412 is controlled to drive a fourth clamping piece 408 to telescope), when a tray separating condition is met (the first limiting part 40 at least supports one empty tray 2, and the second limiting part 41 supports one empty tray 2), the empty trays 2 collected into the accommodating part 20 of the tray separating apparatus 1 from the tray inlet 21 are separated one by one, then the first transmission part 30 outputs the empty trays 2 from the tray outlet 22, so as to transmit the empty trays 2 to the passengers one by one for the passengers to take and place their luggage for security checks, and the security check efficiency is improved.

In some possible implementations, in a case of adopting sensors (a first sensor, a second sensor, a third sensor, a fourth sensor and a fifth sensor) in the tray separating apparatus 1 described in any above embodiment:

when the first sensor detects that an empty tray 2 exists at a first height, manual transmission of the empty trays 2 to the tray inlet 21 of the accommodating part 20 is stopped. As mentioned earlier, the first sensor is configured to detect whether the empty trays 2 collected in the accommodating part 20 overflow, and if yes, an alarm will be given. Manual placement of the empty trays 2 into the accommodating part 20 is stopped, and a situation that the second limiting part 41 cannot separate trays in time or be abnormal in tray separating operation, resulting in the increasing quantity of the empty trays 2 supported by the first limiting part 40 is prevented.

When the second sensor detects that an empty tray 2 exists at a second height, automatic transmission of the empty trays 2 to the tray inlet 21 of the accommodating part 20 is stopped. As mentioned earlier, the second sensor is configured to detect whether the empty trays 2 collected in the accommodating part 20 overflow, and if yes, an alarm will be given. Automatic placement (such as through the second transmission part 50) of the empty trays 2 into the accommodating part 20 is stopped, and a situation that the second limiting part 41 cannot separate trays in time or be abnormal in tray separating, resulting in the increasing quantity of the empty trays 2 supported by the first limiting part 40 is prevented.

When the third sensor detects that an empty tray 2 that abuts against the first limiting part 40 exists, the fourth sensor detects that no empty tray 2 that abuts against the second limiting part 41 exists, and the second limiting part 41 stays at the third position, the first limiting part 40 is is controlled to stay at the second position. On the one hand, the first limiting part 40 may be controlled to be switched to the second position to provide the empty trays 2 to the second limiting part 41, for example, above S105 is performed, and new empty trays 2 are supplemented to the second limiting part 41, so as to perform the tray separating operation.

On the other hand, after the third sensor detects that no empty tray 2 that abuts against the first limiting part 40 exists, the second transmission part 50 may be controlled to continue to transmit the empty trays 2 to the accommodating part 20, at this time, the first limiting part 40 may stay at the first position, and the empty trays 2 are borne by the first limiting part 40; alternatively, the first limiting part 40 stays at the second position, and the empty trays 2 are borne by the second limiting part 41, for example, above S101 is performed; and the first limiting part 40 may further be controlled to be switched to the first position from the second position, so as to abut against the empty trays 2, for example, above S102 or S106 is performed.

When the fourth sensor detects that an empty tray 2 that abuts against the second limiting part 41 exists, the first limiting part 40 is controlled to stay at the first position. The tray separating operation may be performed, that is, the second limiting part 41 is controlled to stay at the fourth position, that is, above S103 is performed. Alternatively, when it is necessary to support the empty tray 2 by the first limiting portion 40, S102 as described above is performed.

When the fourth sensor detects that the empty tray 2 that abuts against the second limiting part 41 exists, and the fifth sensor detects that an area of the first transmission part 30 corresponding to the accommodating part 20 does not carry an empty tray 2, the second limiting part 41 is controlled to stay at the fourth position, and the first limiting part 40 is controlled to stay at the first position. That is, the tray separating operation may be performed, for example, above S103 is performed.

When the fourth sensor detects that the empty tray 2 that abuts against the second limiting part 41 exists, and the fifth sensor detects that the area of the first transmission part 30 corresponding to the accommodating part 20 carries the empty tray 2, the second limiting part 41 is controlled to stay at the third position. At this time, the separated empty trays 2 have not been fully outputted by the first transmission part 30 from the tray outlet 22, the second limiting part 41 cannot perform the tray separating operation, and it is necessary to control the second limiting part 41 to stay at the third position.

When the fourth sensor detects that no empty tray 2 that abuts against the second limiting part 41 exists, the second limiting part 41 is controlled to stay at the third position. At this time, the second limiting part 41 does not support the empty trays 2, and the empty trays 2 may be transmitted to the second limiting part 41, so as to perform the tray separating operation, for example, above S101 and S104 are performed.

To sum up, by adopting the tray separating method of the present application, the tray separating efficiency is high, and the security check efficiency of the passengers is improved.

Figure 16:
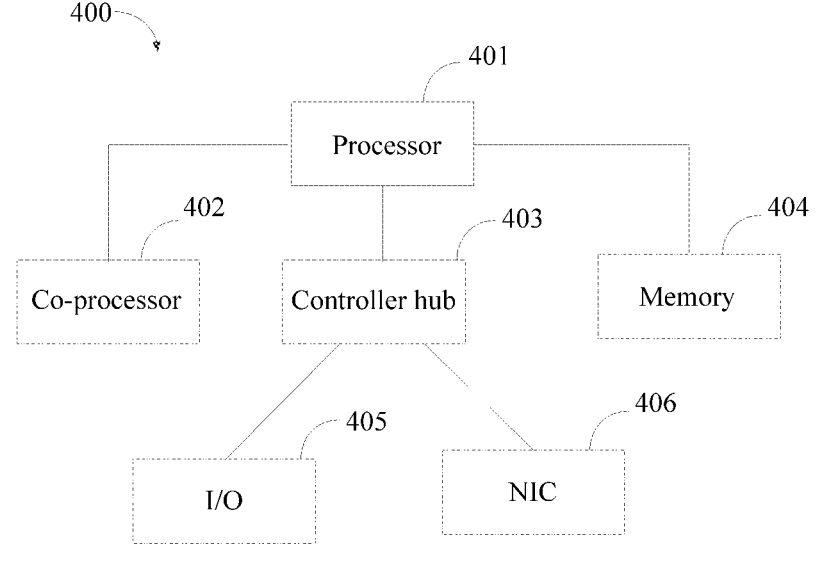
FIG. 16 shows a block diagram of an electronic device provided by an embodiment of the present application.

Now referring to FIG. 16, FIG. 16 shows a block diagram of an electronic device 400 provided by an embodiment of the present application. The electronic device 400 is, for example, the above tray separating apparatus 1. The electronic device 400 may include one or more processors 401 coupled to a controller hub 403. For at least one embodiment, the controller hub 403 communicates with the processor 401 through a multi-branch bus such as a front side bus (FSB), a point-to-point interface such as quickpath interconnect (QPI) or a similar connection 406. The processor 401 executes instructions that control general types of data processing operations. In one embodiment, the controller hub 403 includes, but is not limited to, a graphics & memory controller hub (GMCH) (not shown) and an input output hub (IOH) (which may be on separate chips) (not shown), where the GMCH includes a memory and a graphics controller, and is coupled to the IOH.

The electronic device 400 may further include a co-processor 402 and a memory 404 which coupled to the controller hub 403. Alternatively, one or two of the memory and the GMCH may be integrated into the processor (as described in the present application), the memory 404 and the co-processor 402 are directly coupled to the processor 401 and the controller hub 403, and the controller hub 403 and the IOH are located in a single chip.

The memory 404 may be, for example, a dynamic random access memory (DRAM), a phase change memory (PCM) or a combination of the two. The memory 404 may include one or more tangible and non-transitory computer readable media for storing data and/or instructions. The computer readable storage medium stores an instruction, specifically temporary and permanent copies of the instruction. The instruction may include: an instruction, when executed by at least one of the processors, enabling the electronic device 400 to implement the tray separating method shown in FIG. 15. The instruction, when running on a computer, enables the computer to execute the method disclosed in any above embodiment or a combination of the embodiments, so as to control switching of the first limiting part 40 and the second limiting part 41 at corresponding positions.

In one embodiment, the co-processor 402 is a dedicated processor, such as a high-throughput many integrated core (MIC) processor, a network or communication processor, a compression engine, a graphics processor, general-purpose computing on graphics processing units (GPGPU), or an embedded processor. The optional properties of the co-processor 402 are represented by dashed lines in FIG. 16.

In one embodiment, the electronic device 400 may further include a network interface controller (NIC) 406. The network interface controller 406 may include a transceiver, configured to provide a radio interface for the electronic device 400, so as to communicate with any other suitable device (such as a front-end module and antennas). In various embodiments, the network interface controller 406 may be integrated with other components of the electronic device 400. The network interface controller 406 may implement functions of a communication unit in the above embodiment.

The electronic device 400 may further include an input output (IO) device 405. The IO device 405 may include: a user interface, which allows users to interact with the electronic device 400; a peripheral component interface design also allows a peripheral component to interact with the electronic device 400; and/or a sensor design is configured to determine environmental conditions and/or position information related to the electronic device 400.

It is worth noting that FIG. 16 is only exemplary. Although FIG. 16 shows that the electronic device 400 includes multiple devices such as the processor 401, the controller hub 403 and the memory 403. In practical applications, the device using the methods of the present application may only include a part of the devices of the electronic device 400, for example, only the processor 401 and the network interface controller 406. The properties of the optional devices in FIG. 16 are shown by dashed lines.

Figure 17:
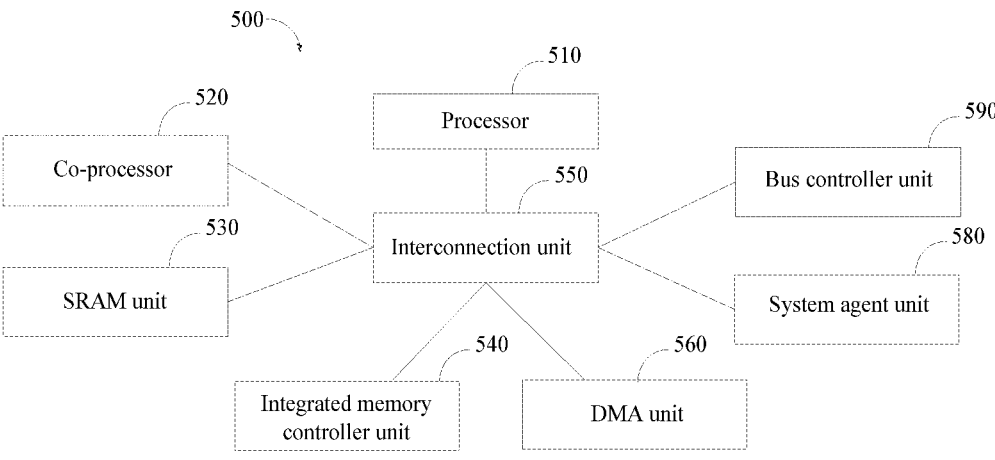
FIG. 17 shows a block diagram of a system on chip (SoC) provided by an embodiment of the present application.

Now referring to FIG. 17, FIG. 17 shows a block diagram of a system on chip (SoC) 500 of an embodiment of the present application. In FIG. 17, similar components have the same reference numerals. In addition, dashed boxes are optional features of more advanced SoC. In FIG. 17, the SoC 500 includes: an interconnection unit 550, coupled to a processor 510; a system agent unit 580; a bus controller unit 590; an integrated memory controller unit 540; one group or one or more co-processors 520, which may include an integrated graphics logic, an image processor, an audio processor, and a video processor; a static random-access memory (SRAM) unit 530; and a direct memory access (DMA) unit 560. In one embodiment, the co-processor 520 includes a dedicated processor, such as a network or communication processor, a compression engine, general-purpose computing on graphics processing units (GPGPU), a high-throughput MIC processor, or an embedded processor.

The static random-access memory (SRAM) unit 530 may include one or more tangible and non-transitory computer readable media for storing data and/or instructions. The computer readable storage medium stores an instruction, specifically temporary and permanent copies of the instruction. The instruction may include: an instruction, when executed by at least one of the processors, causing the SoC to implement the tray separating method shown in FIG. 15. The instruction, when running on a computer, enables the computer to execute the method disclosed in the above embodiments.

The implementations of each method in the present application may be realized through software, magnetic components, firmware, etc.

Program codes may be applied to inputting instructions to perform the various functions described in this article and generate output information. The output information may be applied to one or more output devices in a known manner. For the purpose of the present application, a processing system includes any system with a processor such as a digital signal processor (DSP), a microcontroller, a specialized integrated circuit (ASIC), or a microprocessor.

The program codes may be implemented in advanced programming languages or object-oriented programming languages to communicate with the processing system. When necessary, assembly languages or machine codes may also be used to implement the program codes. In fact, the mechanisms described in this article are not limited to the scope of any specific programming language. In any case, the language may be a compiled or interpreted language.

One or more aspects of at least one embodiment may be implemented by representational instructions stored on the computer readable storage medium, which represent various logics in the processor, causing, when the instructions are read by a machine, the machine to produce a logic for executing the techniques described in this article. These representations, known as "IP (intellectual property) cores," may be stored on a tangible computer readable storage medium and provided to multiple customers or production facilities for loading into a manufacturing machine that actually manufactures the logic or processor.

In some cases, an instruction converter may be used to convert instructions from a source instruction set to a target instruction set. For example, the instruction converter may transform (such as using a static binary transform, including a dynamic binary transform of dynamic compilation), deform, simulate, or otherwise convert instructions into one or more other instructions to be processed by the core. The instruction converter may be implemented using software, hardware, firmware, or a combination thereof. The instruction converter may be on the processor, off the processor, or partially on the processor and partially off the processor.

Although the present invention has been illustrated and described by referring to certain preferred embodiments, those ordinarily skilled in the art should understand that the above content is a further detailed explanation of the present invention in conjunction with the specific implementations, and it cannot be considered that the specific implementations of the present invention are limited to these explanations. Those skilled in the art may make various changes in form and details, including making several simple deductions or substitutions, without departing from the spirit and scope of the present invention.

The invention claimed is:

1. A tray separating apparatus, comprising:
  a main body, having an accommodating part, the accommodating part extending in a first direction;
  a tray inlet, located at a top of the main body, the tray inlet communicating with the accommodating part, and the accommodating part being configured to receive an empty tray placed from the tray inlet;
  a tray outlet, located at a side of the main body, the tray outlet communicating with the accommodating part;
  a first transmission part, located at a bottom of the accommodating part, the first transmission part being configured to carry the empty tray, and output the empty tray from the tray outlet in a second direction, and the second direction being perpendicular to the first direction;
  a first limiting part, mounted on the main body, wherein the first limiting part is able to be switched between a first position and a second position; and
  a second limiting part, mounted on the main body, the second limiting part being located below the first limiting part in the first direction, wherein the second limiting part is able to be switched between a third position and a fourth position; wherein:
    at the first position, the first limiting part is able to abut against the empty tray placed from the tray inlet, so as to limit downward movement of the empty tray in the first direction, and the empty tray that abuts against the first limiting part is able to be stacked with more than one empty tray placed from the tray inlet;

at the second position, the first limiting part is able to be separated from the empty tray placed from the tray inlet, so as to enable the empty tray to move downwards in the first direction;

at the third position, the second limiting part is able to abut against the empty tray placed from the tray inlet, so as to limit downward movement of the empty tray in the first direction; and at the fourth position, the second limiting part is able to be separated from the empty tray placed from the tray inlet, so as to enable one empty tray to move downwards in the first direction to be borne by the first transmission part;

a first detection hole, communicating with the accommodating part, wherein the first detection hole is provided with a first sensor, the first sensor is configured to detect whether an empty tray exists at a first height, and in the first direction, the first height is higher than a height of a position where the first limiting part is located;

a second detection hole, communicating with the accommodating part, wherein the second detection hole is provided with a second sensor, the second sensor is configured to detect whether an empty tray exists at a second height, the second height is smaller than the first height, and the second height is higher than the height of the position where the first limiting part is located;

a third detection hole, communicating with the accommodating part, wherein the third detection hole is provided with a third sensor, and the third sensor is configured to detect whether an empty tray that abuts against the first limiting part exists;

a fourth detection hole, communicating with the accommodating part, wherein the fourth detection hole is provided with a fourth sensor, and the fourth sensor is configured to detect whether an empty tray that abuts against the second limiting part exists; and a fifth detection hole, communicating with the accommodating part, wherein the fifth detection hole is provided with a fifth sensor, and the fifth sensor is configured to detect whether an area of the first transmission part corresponding to the accommodating part carries an empty tray.

2. The tray separating apparatus of claim 1, wherein:

at the third position, the second limiting part is able to abut against the empty tray that is separated from the first limiting part; and at the fourth position, the second limiting part is able to be separated from one empty tray that is separated from the first limiting part.

3. The tray separating apparatus of claim 1, wherein:

at the third position, the second limiting part is able to abut against one empty tray, and the empty tray is able to be stacked with the other empty tray;

at the fourth position, the second limiting part is able to be separated from the one empty tray;

at the first position, the first limiting part is able to abut against the other empty tray, and the other empty tray is able to be stacked with more than one empty tray placed from the tray inlet; and at the second position, the first limiting part is able to be separated from the other empty tray, so as to enable the other empty tray and the empty trays stacked in the other empty tray to move downwards in the first direction, and the other empty tray is able to abut against the second limiting part.

4. The tray separating apparatus of claim 1, wherein:

at the first position, the first limiting part is able to abut against a lowest empty tray among the multiple stacked empty trays placed from the tray inlet; and at the second position, the first limiting part is able to be separated from the lowest empty tray.

5. The tray separating apparatus of claim 1, wherein:

at the first position, the first limiting part is able to abut against one empty tray; at the third position, the second limiting part is able to abut against one empty tray; and the empty tray that abuts against the first limiting part is located in the empty tray that abuts against the second limiting part.

6. The tray separating apparatus of claim 1, wherein, in a third direction, the accommodating part comprises a first part and a second part which are oppositely arranged, the first part and the second part extend in the first direction respectively, the first part is provided with a first through hole, the second part is provided with a second through hole, and the first direction, the second direction and the third direction are perpendicular to one another;

the first limiting part comprises:

a first electric cylinder, mounted on one side of the main body opposite to the first part, wherein the first electric cylinder has a first telescopic piece, the first telescopic piece is provided with a first clamping piece, and the first clamping piece is located at the first through hole; and a second electric cylinder, mounted on one side of the main body opposite to the second part, and spaced apart from the first electric cylinder in the third direction, wherein the second electric cylinder has a second telescopic piece, the second telescopic piece is provided with a second clamping piece, and the second clamping piece is located at the second through hole;

the second limiting part comprises:

a third electric cylinder, mounted on the side of the main body opposite to the first part, wherein the third electric cylinder has a third telescopic piece, the third telescopic piece is provided with a third clamping piece, and the third clamping piece is located at the first through hole; and a fourth electric cylinder, mounted on the side of the main body opposite to the second part, and spaced apart from the third electric cylinder in the third direction, wherein the fourth electric cylinder has a fourth telescopic piece, the fourth telescopic piece is provided with a fourth clamping piece, and the fourth clamping piece is located at the second through hole; wherein:

at the first position, the first telescopic piece and the second telescopic piece are able to move in a direction towards the accommodating part, so that the first clamping piece extends into the accommodating part through the first through hole to abut against one side of one empty tray, and the second clamping piece extends into the accommodating part through the second through hole to abut against the other side of the empty tray, so as to limit downward movement of the empty tray in the first direction;

at the second position, the first telescopic piece and the second telescopic piece are able to move in a direction away from the accommodating part, so that the first clamping piece retracts through the first through hole to be separated from one side of one empty tray, and the second clamping piece retracts through the second through hole to be separated from the other side of the empty tray, so as to enable the empty tray to move downwards in the first direction;

at the third position, the third telescopic piece and the fourth telescopic piece are able to move in the direction towards the accommodating part, so that the third clamping piece extends into the accommodating part through the first through hole to abut against one side of one empty tray, and the fourth clamping piece extends into the accommodating part through the second through hole to abut against the other side of the empty tray, so as to limit downward movement of the empty tray in the first direction; and at the fourth position, the third telescopic piece and the fourth telescopic piece are able to move in the direction away from the accommodating part, so that the third clamping piece retracts through the first through hole to be separated from one side of one empty tray, and the fourth clamping piece retracts through the second through hole to be separated from the other side of the empty tray, so as to enable the empty tray to move downwards in the first direction to be borne by the first transmission part.

7. The tray separating apparatus of claim 6, wherein the first clamping piece is arranged parallel to the third clamping piece, and the second clamping piece is arranged parallel to the fourth clamping piece.

8. The tray separating apparatus of claim 7, wherein the first clamping piece and the third clamping piece extend towards a top of the accommodating part in a fourth direction, the second clamping piece and the fourth clamping piece extend towards the top of the accommodating part in a fifth direction, an included angle between the fourth direction and the first direction is a first acute angle, an included angle between the fifth direction and the first direction is a second acute angle, and the first acute angle is equal to the second acute angle.

9. The tray separating apparatus of claim 6, wherein:

the first clamping piece, the second clamping piece, the third clamping piece and the fourth clamping piece are in a sheet shape respectively;

at the first position, the first clamping piece and the second clamping piece are able to abut against an outer edge of one empty tray; and at the third position, the third clamping piece and the fourth clamping piece are able to abut against the outer edge of one empty tray.

10. The tray separating apparatus of claim 6, wherein, in the first direction, a distance between the first clamping piece and the third clamping piece, and a distance between the second clamping piece and the fourth clamping piece meet following requirement: an outer edge of a lower empty tray in any two adjacent stacked empty trays is able to abut against the third clamping piece and the fourth clamping piece, and an outer edge of an upper empty tray in the any two adjacent stacked empty trays is able to abut against the first clamping piece and the second clamping piece.

11. The tray separating apparatus of claim 1, wherein each sensor is able to emit laser rays to the outer edges of the empty trays for corresponding detection.

12. The tray separating apparatus of claim 1, wherein the quantity of the fifth detection hole is two, each fifth detection hole is provided with one fifth sensor, and the two fifth sensors are arranged in the second direction at an interval, and correspond to the area of the first transmission part corresponding to the accommodating part; and in the second direction, a detection distance between the two fifth sensors is a first numerical value, a width of the area of the first transmission part corresponding to the accommodating part is a second numerical value, and a difference value between the first numerical value and the second numerical value is within a set range.

13. The tray separating apparatus of claim 12, wherein the first numerical value is equal to the second numerical value.

14. The tray separating apparatus of claim 1, wherein the first transmission part comprises: multiple electric rollers distributed in the second direction.

15. The tray separating apparatus of claim 1, further comprising a second transmission part, spaced apart from and parallel to the first transmission part in the first direction, wherein the second transmission part is configured to transmit empty trays to the tray inlet.

16. The tray separating apparatus of claim 15, wherein the second transmission part comprises: multiple electric rollers distributed in the second direction.

17. A security check system, comprising the tray separating apparatus of claim 1.

18. A tray separating method, adopting the tray separating apparatus of claim 1, further comprising:

S101: controlling a first limiting part to stay at a second position, and a second limiting part to stay at a third position;

S102: controlling the first limiting part to stay at a first position, and the second limiting part to stay at the third position;

S103: controlling the first limiting part to stay at the first position, and the second limiting part to stay at a fourth position;

S104: controlling the first limiting part to stay at the first position, and the second limiting part to stay at the third position;

S105: controlling the first limiting part to stay at the second position, and the second limiting part to stay at the third position; and S106: controlling the first limiting part to stay at the first position, and the second limiting part to stay at the third position.

19. The tray separating method of claim 18, wherein:

S101: controlling the first limiting part to stay at the second position, and the second limiting part to stay at the third position, and transmitting empty trays to a tray inlet of an accommodating part, wherein the second limiting part abuts against one empty tray placed from the tray inlet, and the empty tray that abuts against the second limiting part is stacked with at least one empty tray;

S102: controlling the first limiting part to stay at the first position, and the second limiting part to stay at the third position, wherein the first limiting part abuts against the empty trays stacked in the empty tray that abuts against the second limiting part, and the empty trays that abut against the first limiting part are able to be stacked with more than one empty tray placed from the tray inlet;

S103: controlling the first limiting part to stay at the first position, and the second limiting part to stay at the fourth position, wherein one empty tray that abuts against the second limiting part is separated from the second limiting part, and moves downwards in a first direction to be borne by a first transmission part, and the first transmission part outputs the empty tray through a tray outlet in a second direction;

S105: controlling the first limiting part to stay at the second position, and the second limiting part to stay at the third position, wherein all empty trays that abut against the first limiting part are separated from the first limiting part, and move downwards in the first direction to abut against the second limiting part; and S106: controlling the first limiting part to stay at the first position, and the second limiting part to stay at the third position, wherein the first limiting part abuts against the empty trays stacked in the empty tray that abuts against the second limiting part.

20. The tray separating method of claim 18, wherein S103 to S106 are repeated.

21. A tray separating method, adopting the tray separating apparatus of claim 1, comprising:

S101: controlling the first limiting part to stay at the second position, and the second limiting part to stay at the third position, and transmitting empty trays to a tray inlet of an accommodating part, wherein the second limiting part abuts against one empty tray placed from the tray inlet, and the empty tray that abuts against the second limiting part is stacked with at least one empty tray;

S102: controlling the first limiting part to stay at the first position, and the second limiting part to stay at the third position, wherein the first limiting part abuts against the empty trays stacked in the empty tray that abuts against the second limiting part, and the empty trays that abut against the first limiting part are able to be stacked with more than one empty tray placed from the tray inlet;

S103: controlling the first limiting part to stay at the first position, and the second limiting part to stay at the fourth position, wherein one empty tray that abuts against the second limiting part is separated from the second limiting part, and moves downwards in a first direction to be borne by a first transmission part, and the first transmission part outputs the empty tray through a tray outlet in a second direction;

S104: controlling the first limiting part to stay at the first position, and the second limiting part to stay at the third position;

S105: controlling the first limiting part to stay at the second position, and the second limiting part to stay at the third position, wherein all empty trays that abut against the first limiting part are separated from the first limiting part, and move downwards in the first direction to abut against the second limiting part; and S106: controlling the first limiting part to stay at the first position, and the second limiting part to stay at the third position, wherein the first limiting part abuts against the empty trays stacked in the empty tray that abuts against the second limiting part, wherein:

when the first sensor detects that an empty tray exists at a first height, manual transmission of the empty trays to the tray inlet of the accommodating part is stopped;

when the second sensor detects that an empty tray exists at a second height, automatic transmission of the empty trays to the tray inlet of the accommodating part is stopped;

when the third sensor detects that an empty tray that abuts against the first limiting part exists, the fourth sensor detects that no empty tray that abuts against the second limiting part exists, and the second limiting part stays at the third position, the first limiting part is controlled to stay at the second position;

when the fourth sensor detects that an empty tray that abuts against the second limiting part exists, the first limiting part is controlled to stay at the first position;

when the fourth sensor detects that the empty tray that abuts against the second limiting part exists, and a fifth sensor detects that an area of the first transmission part corresponding to the accommodating part does not carry an empty tray, the second limiting part is controlled to stay at the fourth position, and the first limiting part is controlled to stay at the first position;

when the fourth sensor detects that the empty tray that abuts against the second limiting part exists, and the fifth sensor detects that the area of the first transmission part corresponding to the accommodating part carries the empty tray, the second limiting part is controlled to stay at the third position; and when the fourth sensor detects that no empty tray that abuts against the second limiting part exists, the second limiting part is controlled to stay at the third position.

22. A non-transitory computer readable storage medium, wherein the computer readable storage medium stores an instruction, and the instruction, when executed on a computer, enables the computer to execute the tray separating method of claim 18.

* * * * *